US012698575B2

(12) United States Patent
Hsieh et al.

(10) Patent No.: US 12,698,575 B2
(45) Date of Patent: Aug. 4, 2026

---

(54) COAXIAL CELLULOSE-BASED AEROGEL FIBERS

(71) Applicant: The Regents of the University of California, Oakland, CA (US)

(72) Inventors: You-Lo Hsieh, Davis, CA (US); Jian Zhou, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 1097 days.

(21) Appl. No.: 16/952,798

(22) Filed: Nov. 19, 2020

(65) Prior Publication Data

US 2021/0156051 A1      May 27, 2021

Related U.S. Application Data

(60) Provisional application No. 62/938,800, filed on Nov. 21, 2019.

(51) Int. Cl.
*D01F 8/02* (2006.01)
*C08J 9/28* (2006.01)
(Continued)

(52) U.S. Cl.
CPC ................ *D01F 8/02* (2013.01); *C08J 9/283* (2013.01); *C08L 1/02* (2013.01); *D01D 5/06* (2013.01);
(Continued)

(58) Field of Classification Search
CPC ............... C08J 9/283; C08J 2201/0484; C08J 2301/02; C08J 2205/026; C08J 2401/02;

C08J 9/0085; C08J 5/005; C08J 5/045; C08L 1/02; C08L 2203/12; C08L 2205/16; C08L 25/18; C08L 65/00; C08L 81/08; D01D 10/00; D01D 5/06; D01D 5/24;
(Continued)

(56) References Cited

U.S. PATENT DOCUMENTS 3,682,856 A * 8/1972 Adams ..................... C09D 7/43
524/703
4,323,627 A * 4/1982 Joh ........................ B01D 69/08
264/561
(Continued)

FOREIGN PATENT DOCUMENTS

CN        104264260 A      1/2015
CN        208545523 U  *  2/2019
(Continued)

OTHER PUBLICATIONS

Yang et al. "Flexible highly specific capacitance aerogel electrodes based on cellulose nanofibers, carbon nanotubes and polyaniline"; Electrochimica Acta, Nov. 2015 (Year: 2015).*
(Continued)

*Primary Examiner* — Lynda Salvatore
(74) *Attorney, Agent, or Firm* — Mintz Levin Cohn Ferris Glovsky and Popeo, P.C.

(57) ABSTRACT

The present disclosure provides a coaxial fiber comprising a cellulose fiber exterior, and a hollow interior, wherein the aerogel occupies the hollow interior of the cellulose fiber. The present disclosure also provides a method of making the coaxial fiber, and a method of maintain a temperature differential in two zones using the coaxial fibers described herein.

23 Claims, 14 Drawing Sheets

(51) Int. Cl.
| | |
|---|---|
| *C08L 1/02* | (2006.01) |
| *D01D 5/06* | (2006.01) |
| *D01D 10/00* | (2006.01) |
| *D01F 8/16* | (2006.01) |

(52) U.S. Cl.
CPC .............. *D01D 10/00* (2013.01); *D01F 8/16* (2013.01); *C08J 2201/0484* (2013.01); *C08J 2205/026* (2013.01); *C08J 2301/02* (2013.01); *C08L 2203/12* (2013.01); *C08L 2205/16* (2013.01)

(58) Field of Classification Search
CPC .. D01D 5/247; D01F 8/02; D01F 8/16; D01F 2/00; D01F 2/28; D01F 6/52; D21H 11/18; D21H 13/50; D21H 17/67; D21H 27/00; C08B 15/00
USPC ......................................................... 428/373
See application file for complete search history.

(56) References Cited

U.S. PATENT DOCUMENTS

| | | | |
|---|---|---|---|
| 9,255,008 B2 | 2/2016 | Howard et al. | |
| 10,077,193 B2 | 9/2018 | Kugumiya et al. | |
| 10,350,576 B2 * | 7/2019 | Gong ..................... | B01J 20/267 |
| 11,248,107 B2 | 2/2022 | Hsieh et al. | |
| 11,549,854 B2 | 1/2023 | Hsieh et al. | |
| 11,654,409 B2 | 5/2023 | Bertino et al. | |
| 11,920,304 B2 | 3/2024 | Hsieh et al. | |
| 2012/0216718 A1 | 8/2012 | Berglund et al. | |
| 2014/0134415 A1 | 5/2014 | Gong et al. | |
| 2015/0114907 A1 * | 4/2015 | Gong ................. | B01J 20/28023 210/660 |
| 2015/0321921 A1 | 11/2015 | Zeng et al. | |
| 2016/0010279 A1 | 1/2016 | Hu et al. | |
| 2018/0040806 A1 | 2/2018 | Gong et al. | |
| 2019/0309144 A1 | 10/2019 | Hsieh et al. | |
| 2020/0339783 A1 | 10/2020 | Cunha et al. | |
| 2020/0353437 A1 | 11/2020 | Bertino et al. | |
| 2020/0363273 A1 | 11/2020 | Hsieh et al. | |
| 2021/0296055 A1 * | 9/2021 | Yajima ................... | H01G 11/78 |
| 2021/0381167 A1 | 12/2021 | Hsieh et al. | |
| 2022/0195148 A1 | 6/2022 | Hsieh et al. | |

FOREIGN PATENT DOCUMENTS

| | | | | |
|---|---|---|---|---|
| EP | 2990510 A1 * | 3/2016 | .............. | D01D 5/24 |
| WO | 2017116598 A1 | 7/2017 | | |
| WO | 2020087075 A1 | 4/2020 | | |

OTHER PUBLICATIONS

International Search Report and Written Opinion received for PCT Application No. PCT/US2019/058376, mailed on Jan. 13, 2020, 9 pages.
Gao et al. (2010) "Epitaxial Graphene on Cu(111)", Nano Letters, 10(9):3512-3516.
Geim A.K. (Jun. 19, 2009) "Graphene: Status and Prospects", Science, 324(5934):1530-1534.
Isobe et al. (Jan. 8, 2018) "Clear Transparent Cellulose Nanopaper Prepared from a Concentrated Dispersion by High-Humidity Drying", RSC Advances, 8(8):1833-1837.
Jiang et al. (2014) "Amphiphilic Superabsorbent Cellulose Nanofibril Aerogels", Journal of Materials Chemistry A, 2(18):6337-6342.
Jiang et al. (2017) "Cellulose Nanofibril Aerogels: Synergistic Improvement of Hydrophobicity, Strength, and Thermal Stability via Cross-Linking with Diisocyanate", ACS Applied Materials & Interfaces, 9(3):2825-2834.
Jiang et al. (2013) "Chemically and Mechanically Isolated Nanocellulose and Their Self- assembled Structures", Carbohydrate Polymers, 95(1):32-40.

Jiang et al. (2013) "Controlled Defibrillation of Rice Straw Cellulose and Self-assembly of Cellulose Nanofibrils into Highly Crystalline Fibrous Materials+", RSC Advances, 3:12366-12375.
Jiang et al. (2018) "Dual Wet and Dry Resilient Cellulose II Fibrous Aerogel for Hydrocarbon-Water Separation and Energy Storage Applications", ACS Omega, 3(3):3530-3539.
Jiang et al. (2016) "Self-assembling of TEMPO Oxidized Cellulose Nanofibrils as Affected by Protonation of Surface Carboxyls and Drying Methods", ACS Sustainable Chemistry & Engineering, 4(3):1041-1049.
Kobayashi et al. (Sep. 22, 2014) "Aerogels with 3D Ordered Nanofiber Skeletons of Liquid-Crystalline Nanocellulose Derivatives as Tough and Transparent Insulators†", Angewandte Chemie-International Edition, 53(39):10394-10397.
Lotya et al. (Mar. 2009) "Liquid Phase Production of Graphene by Exfoliation of Graphite in Surfactant/Water Solutions", Journal of the American Chemical Society, 131(10):3611-3620.
Lu et al. (2012) "Preparation and Characterization of Cellulose Nanocrystals from Rice Straw", Carbohydrate Polymers, 87(1):564-573.
Pääkko et al. (2008) "Long and Entangled Native Cellulose I Nanofibers Allow Flexible Aerogels and Hierarchically Porous Templates for Functionalities", Soft Matter, 4(12):2492-2499.
Paton et al. (2014) "Scalable Production of Large Quantities of Defect-free Few-layer Graphene by Shear Exfoliation in Liquids", Nature Materials, 13(6):624-630.
Sehaqui et al. (2010) "Mechanical Performance Tailoring of Tough Ultra-high Porosity Foams Prepared from Cellulose I Nanofiber Suspensions", Soft Matter, 6:1824-1832.
Wicklein et al. (2015) "Thermally Insulating and Fire-retardant Lightweight Anisotropic Foams Based on Nanocellulose and Graphene Oxide", Nature Nanotechnology, 10:277-283.
Xu et al. (2019) "Aqueous Exfoliated Graphene by Amphiphilic Nanocellulose and its Application in Moisture-responsive Foldable Actuators+", Nanoscale, 11:11719-11729.
Xu et al. (Mar. 22, 2013) "Cellulose Nanocrystals vs. Cellulose Nanofibrils: A Comparative Study on Their Microstructures and Effects as Polymer Reinforcing Agents", ACS Applied Materials & Interfaces, 5(8):2999-3009.
Xu et al. (May 12, 2014) "Comparison Between Cellulose Nanocrystal and Cellulose Nanofibril Reinforced Poly(ethylene oxide) Nanofibers and Their Novel Shish-Kebab-Like Crystalline Structures", Macromolecules, 47:3409-3416.
Zhang et al. (2014) "Ultralightweight and Flexible Silylated Nanocellulose Sponges for the Selective Removal of Oil from Water", Chemistry of Materials, 26:2659-2668.
Zhou et al. (Aug. 9, 2018) "Conductive Polymer Protonated Nanocellulose Aerogels for Tunable and Linearly Responsive Strain Sensors", ACS Applied Materials & Interfaces, 10:27902-27910.
Zhou et al. (Jun. 12, 2013) "Improving Electrical Conductivity in Polycarbonate Nanocomposites Using Highly Conductive PEDOT/PSS Coated MWCNTs", ACS Applied Materials & Interfaces, 5(13):6189-6200.
Zhou et al. (2020) "Nanocellulose Aerogel-based Porous Coaxial Fibers for Thermal Insulation", Nano Energy, 68(104305):9 pages.
Zhou et al. (Feb. 14, 2014) "Probing the Role of Poly(3,4-ethylenedioxythiophene)/Poly(styrenesulfonate)-Coated Multiwalled Carbon Nanotubes in the Thermal and Mechanical Properties of Polycarbonate Nanocomposites", Industrial & Engineering Chemistry Research, 53(9):3539-3549.
Khasim, Journal of Electronic Materials, 2017, 46(7), 4439-4447.
Li et al., "Direct Ink Write 3D Printed Cellulose Nanofiber Aerogel Structures with Highly Deformable, Shape Recoverable, and Functionalizable Properties", ACS Sustainable Chemistry & Engineering 2018, 6(2), 2011-2022.
Yang, "Flexible highly specific capacitance aerogel electrodes based on cellulose nanofibers, carbon nanotubes and polyaniline", Electrochimica Acta, 2015, 182, 264-271.

* cited by examiner

FIG. 1A                            FIG. 1B
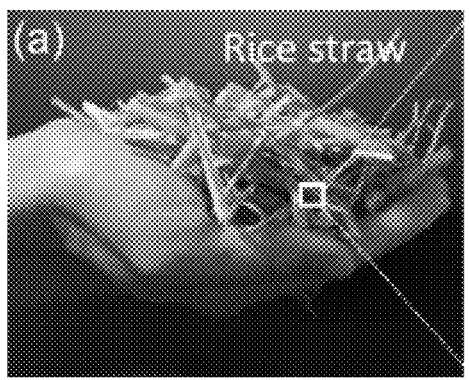 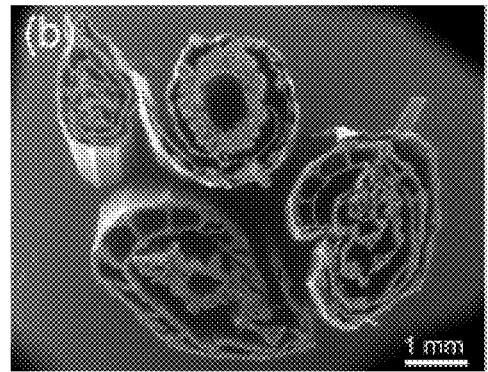
FIG. 1C                            FIG. 1D
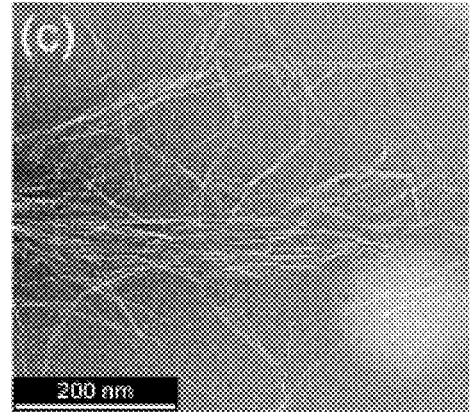 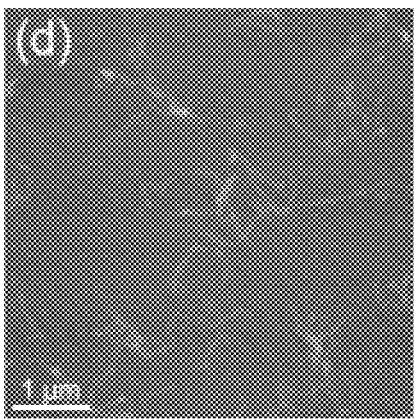
FIG. 1E
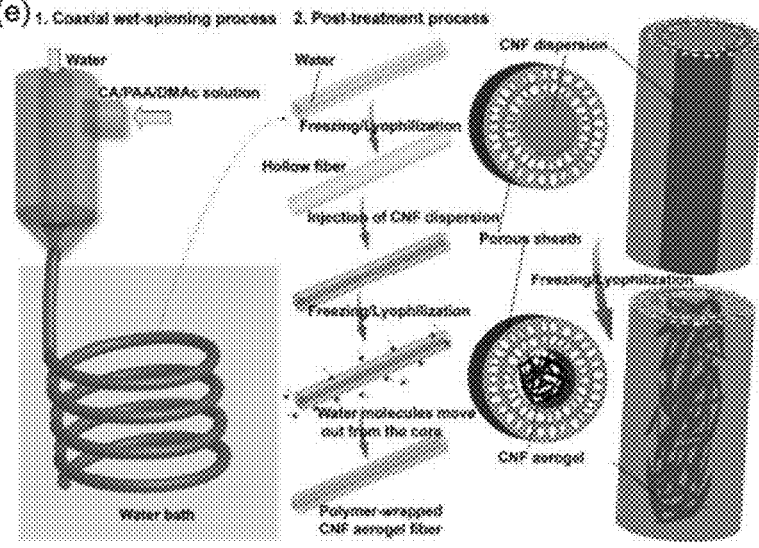

FIG. 3A                                  FIG. 3B
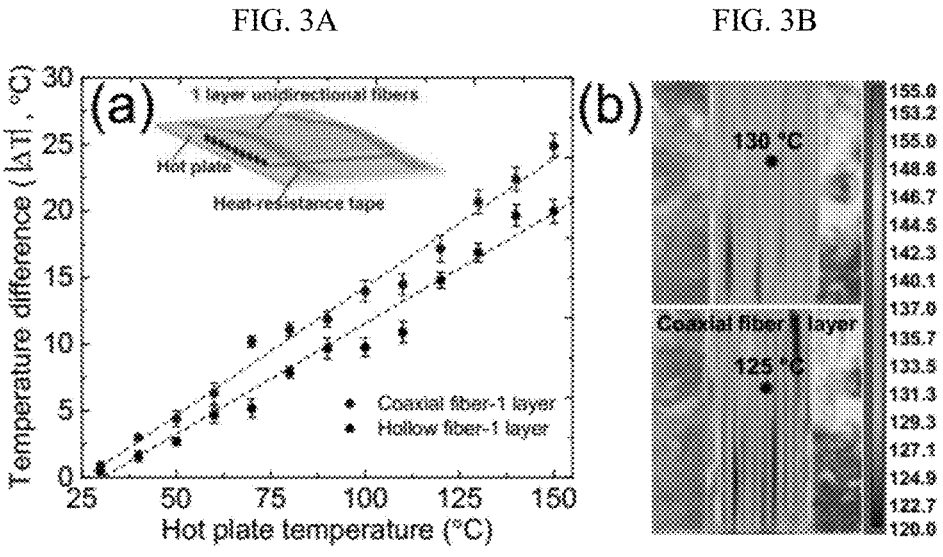
FIG. 3C                                  FIG. 3D
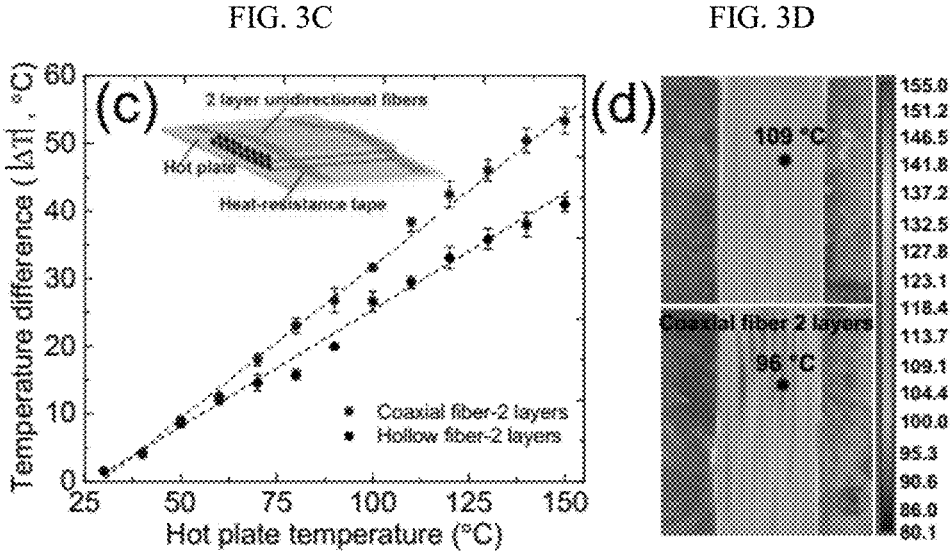

FIG. 3E
FIG. 3F
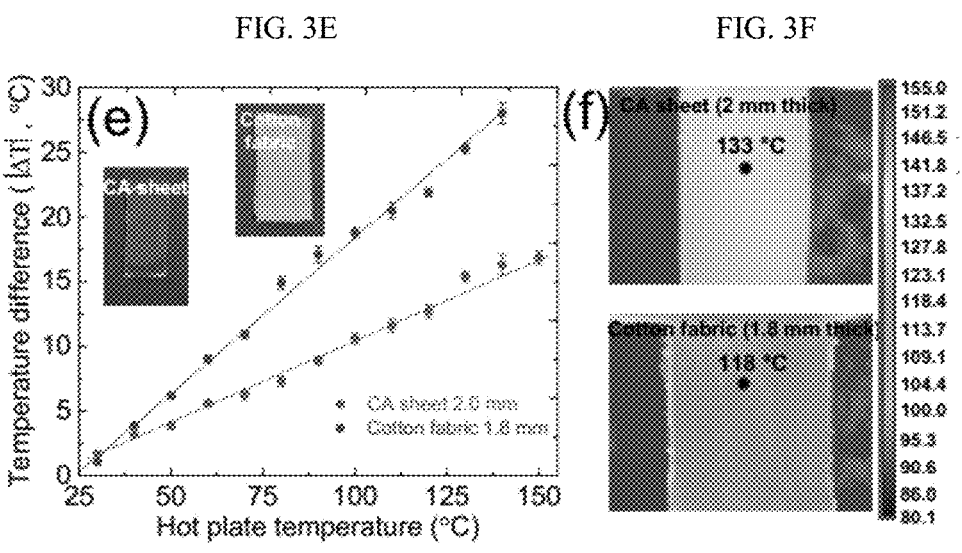
FIG. 3G
FIG. 3H
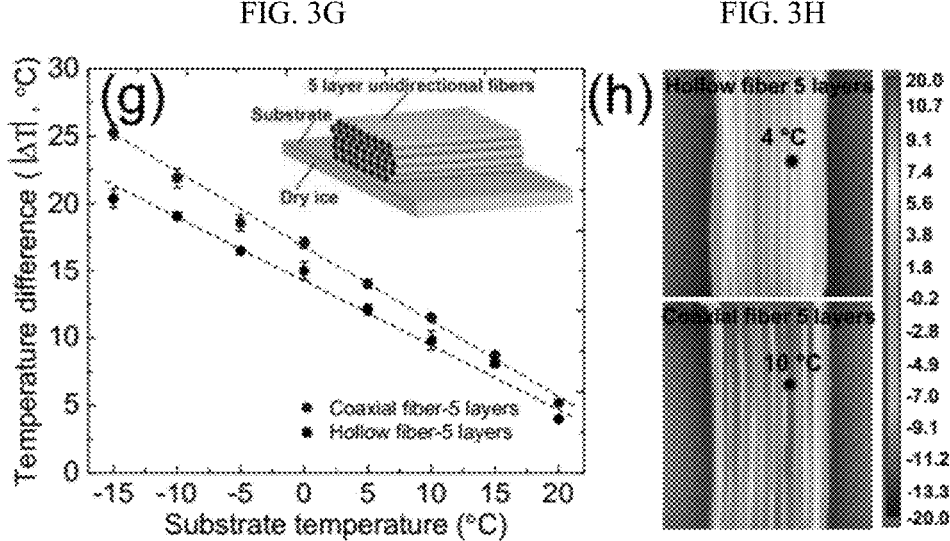
FIG. 3I
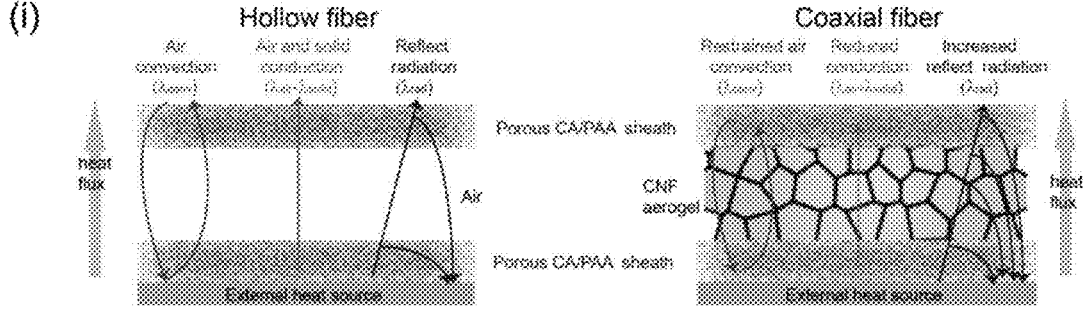

FIG. 4A
FIG. 4B
FIG. 4C
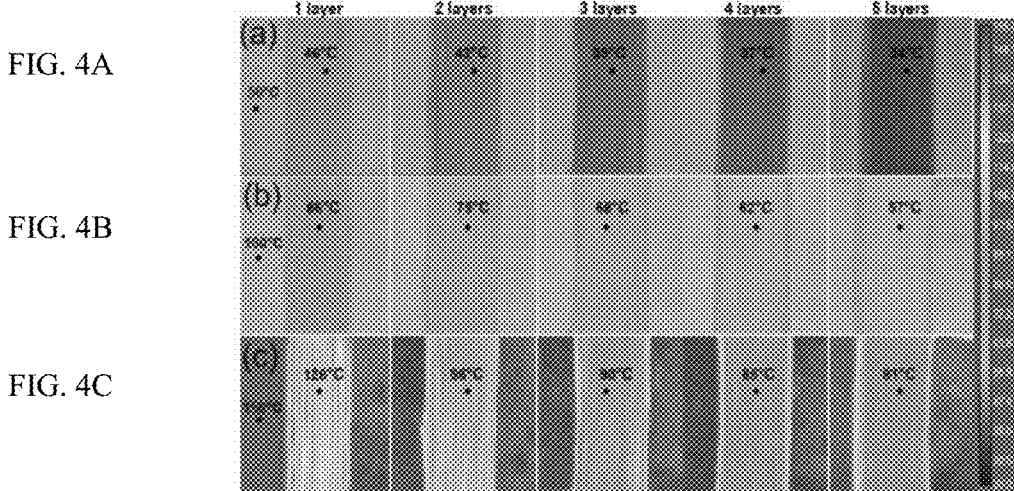
FIG. 4D          FIG. 4E
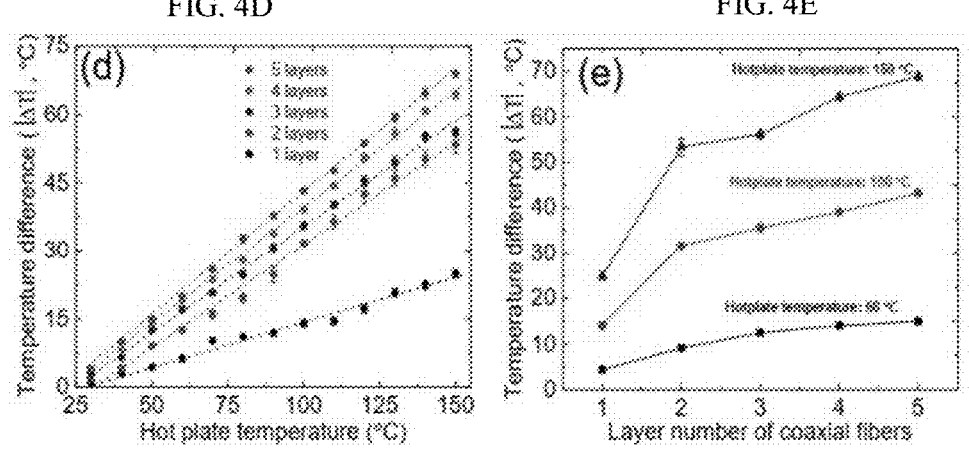

FIG. 5E
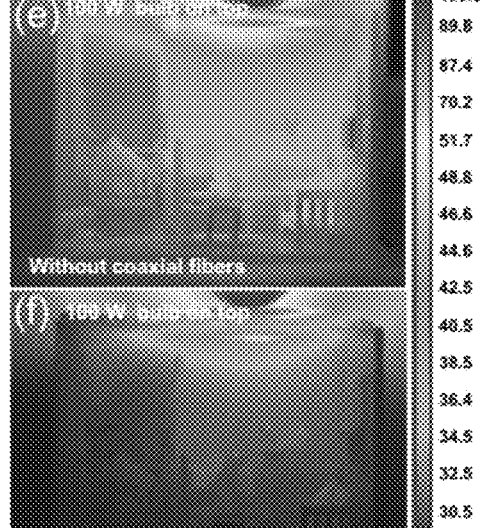
FIG. 5F
FIG. 5G
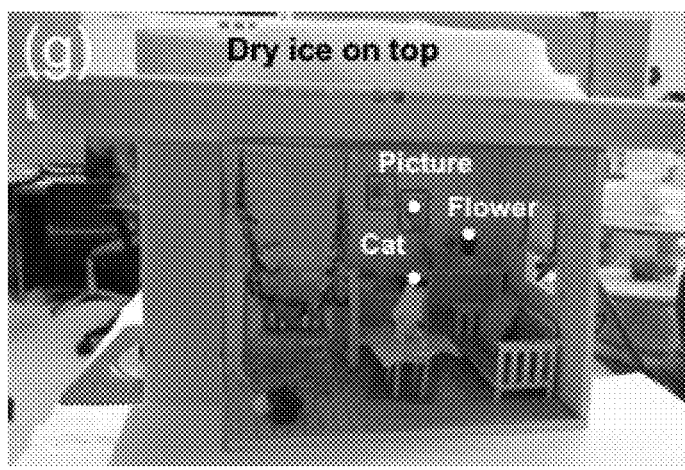

FIG. 5H
FIG. 5I
FIG. 5J     FIG. 5K     FIG. 5L     FIG. 5M     FIG. 5N     FIG. 5O
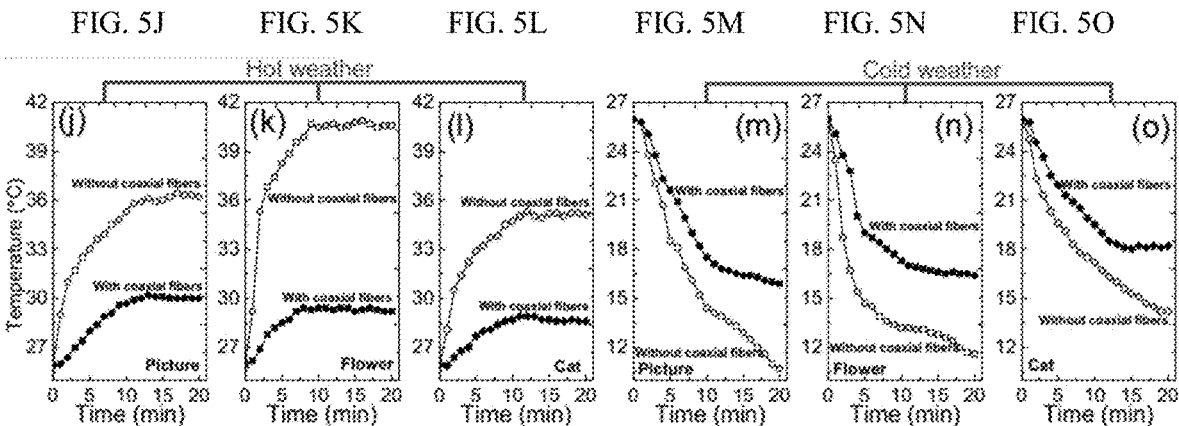

FIG. 9A
FIG. 9B
FIG. 9C
FIG. 9D
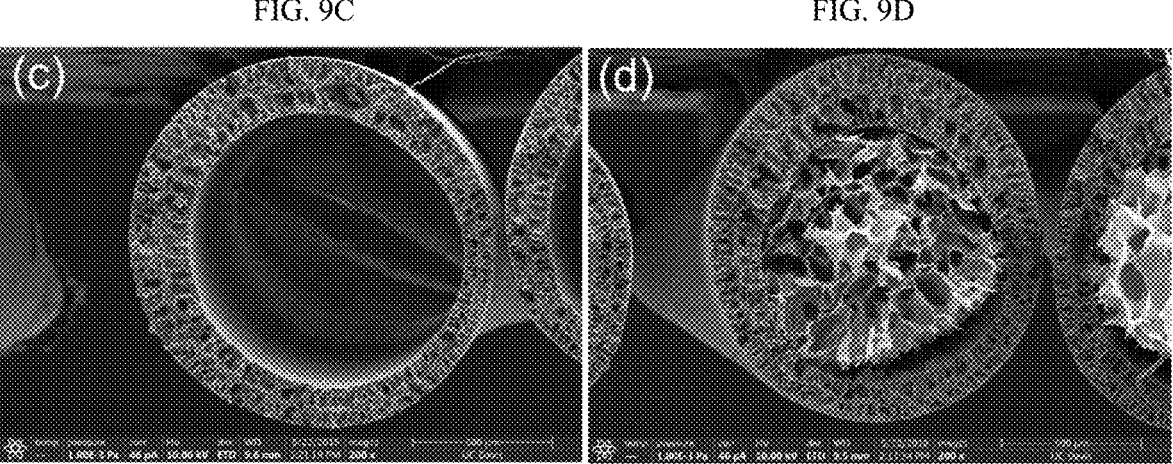
FIG. 10
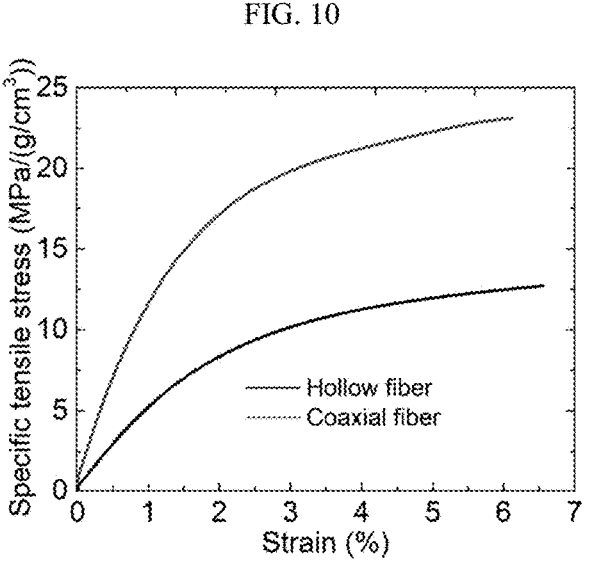

COAXIAL CELLULOSE-BASED AEROGEL FIBERS

CROSS-REFERENCES TO RELATED APPLICATIONS

This application claims priority to U.S. Provisional Application No. 62/938,800 filed Nov. 21, 2019, which is incorporated herein in its entirety for all purposes.

BACKGROUND

Aerogels are the least dense materials with densities approaching air and the most porous materials with porosity over 99%. Thus aerogels are among the most unique for many potential applications, some yet to be discovered. While the most studied and commercially available aerogels are silica aerogels, significant interest has extended to others based on carbon, organic materials, metals and metal oxides. However, aerogels typically have low tensile strength and Young's modulus, making them friable when handled and used alone. Being able to shape aerogels into desired forms and dimensions is attractive from the standpoint of integrating aerogels with other materials for strength and easy handling. In particular, incorporating three-dimensional (3D) aerogels into fibers or filaments are attractive from the standpoint of enabling fabrication into fibrous mats, woven, knitted and nonwoven fabrics, and flexible, stretchable or wearable materials, such as textiles, for thermal protective applications under either hot or cold extreme temperatures. However, high-performance aerogel fibers for insulation purpose are only explored to a very limited extent. For example, neat graphene aerogel fibers were wet-spun from aqueous liquid crystalline graphene oxide (GO) gels into liquid nitrogen to form aligned GO sheets with good mechanical strength. However, coagulation in liquid nitrogen and fiber rigidity made continuous fiber production very challenging. Porous cellulose fibers with a diameter about 500 μm and 93 to 99% porosity were prepared by dissolving cotton linters in $Ca(SCN)_2$ or $ZnCl_2$ salt hydrate melt, then homogenized by a twin-screw extruder, and wet-spun into ethanol, finally dried in supercritical $CO_2$. The best fibers produced showed better heat resistance than cotton cloth under space flight conditions. Both dissolution and coagulation are, however, chemically intensive, and the processes required to produce salt-free fibers are time-consuming. Moreover, densities of these porous fibers were not reported to be verified as aerogels.

Aerogels using cellulose nanofibrils (CNFs) derived from rice straw cellulose through coupled TEMPO-mediated oxidation and mechanical defibrillation, was fabricated. The rice straw derived CNFs are super fine (ca. 2 nm thick), six orders of magnitude smaller than porous rice straws (1.5±0.5 mm wide) (FIGS. 1A-1B, and FIG. 6), and long (up to 1 μm) (FIGS. 1C-1D), thus having a very high aspect ratio and specific surface. Furthermore, these CNF surfaces are amphiphilic, allowing their self-assembling into unique aerogels of super low density (2-8 mg $cm^{-3}$), ultra-high porosity (>99.5%), high specific surface area (123 $m^2$ $g^{-1}$) with a 0.37 $cm^3$ $g^{-1}$ pore volume, and wet-resilience while retaining amphiphilicity. Thermal insulation is among many of the diverse potential applications of these CNF aerogels. First, cellulose is among the least thermally conductive materials. The CNF aerogel cellular structure limits air circulation, making it good convective inhibitor, while its low transparency to infrared radiation inhibits radiative transmission. Such distinguished thermal insulation potential of these CNF aerogels coupled with their unique resiliency and biological origin are particularly attractive for wearable thermal insulators. Therefore, shaping the 3D bulk aerogel into 1D fibers is envisioned to enable integrating CNF aerogels into such devices with scalable potential. Herein is an approach to obtain continuous sheath-core coaxial fibers with highly porous aerogel core for high-performance insulators. The sheath functions as a processable template as well as a surface layer to protect the integrity of the aerogel structure from external forces or the environment.

Strong, continuous, and highly porous coaxial fibers with cellulose nanofibril (CNF) aerogel core and cellulose-rich sheath were fabricated by wet-spinning hollow fibers and infusing them with aerogel precursor for high-performance thermal insulators. The sheath contained multiscale pores, including microvoids (14.5 μm) and sub-micron pores (133 nm) in bulk, as well as ca. 25-26 nm surface nanopores, to function as a template and protective sheath for the microporous CNF aerogel core. The porous coaxial fibers had many desirable qualities, including low density (0.2 g $cm^{-3}$), high porosity (85%), high specific tensile strength (23.5±2.5 MPa g $cm^{-3}$), wide working temperatures (−20 to 150° C.), continuous and large-scale producibility, as well as biodegradability. The unique combination of multiscale porous sheath and ultra-low density aerogel core synergistically minimizes heat conductivity by all three mechanisms, i.e., restrain air circulation to limit convective heat transfer, while the poor conducting cellulose permitting little conductive heat transfer and the highly crystalline aerogel cellular walls prohibit infrared radiation, effectively suppresses radiative heat transfer under extreme temperatures.

BRIEF SUMMARY OF THE INVENTION

In one embodiment, the present invention provides a coaxial fiber comprising a cellulose fiber comprising an exterior and a hollow interior; and an aerogel occupying the hollow interior of the cellulose fiber.

In another embodiment, the present invention provides a method for preparing a coaxial fiber, the method comprising: (a) wet-spinning an organic solution comprising cellulose acetate and polyacrylic acid on the exterior of a water core to form a cellulose fiber comprising an interior and exterior, wherein the interior is filled with water; (b) removing the water to form a hollow cellulose fiber; (c) injecting an aqueous cellulose nanofibril suspension into the hollow cellulose fiber to form a cellulose fiber comprising an aqueous cellulose interior; and (d) freeze-drying the cellulose fiber comprising an aqueous cellulose interior to form a cellulose fiber comprising a nanofibril aerogel interior, thereby forming the fiber.

In another embodiment, the present invention provides a method of maintain a temperature differential between a first zone having a first temperature, and a second zone having a second temperature, comprising: separating the first zone and the second zone using a plurality of coaxial fibers of the present invention; and applying thermal energy to the first zone such that the first temperature increases while the second temperature of the second zone increases by a lesser amount.

BRIEF DESCRIPTION OF THE DRAWINGS

FIGS. 1A-1I show rice straw cellulose, nanocellulose and hollow and coaxial fibers. FIG. 1A shows photograph of rice straws. FIG. 1B shows SEM image of typical rice straw cross-sections showing multilayer porous microstructures. FIGS. 1C and 1D show TEM and AFM images of CNFs derived from rice straw cellulose, respectively. FIG. 1E shows schematic illustrations of coaxial wet-spinning of CA/PAA hollow fiber and post-processes to produce CNF aerogel core in coaxial fibers. FIGS. 1F and 1G show photographs of CA/PAA hollow fibers. FIGS. 1H and 1I show the CA/PAA-sheath and CNF aerogel-core coaxial fibers with arrows pointing the exposed CNF aerogel core of one coaxial fiber.

FIG. 2A shows the CA/PAA hollow fiber cross-section. FIGS. 2B-2D show the enlarged hollow fiber sheath cross-sections are showing microvoids surrounded by sub-micron porous and nanoporous structure. FIGS. 2E and 2F show the inner and outer surfaces of the hollow fiber showing nanoporous structures respectively. FIG. 2G shows the coaxial fiber cross-section is showing a porous sheath and a porous core. FIG. 2H shows the CNF aerogel core of the coaxial fiber. FIGS. 2I and 2J show the sheath in coaxial fiber showing similar microvoids surrounded by sub-micron and nanoporous structures as in hollow fiber sheath. FIGS. 2K and 2L show the inner and outer surfaces of the coaxial fiber sheath showing nanoporous structure.

FIGS. 3A-3I show thermal insulation properties of the hollow and coaxial fiber mats. FIG. 3A shows the temperature difference ($|T|$) of the fiber surface ($T_f$) and hot plate ($T_h$) versus the $T_h$ for 1-layer hollow fibers and 1-layer coaxial fibers. Inset in (a) shows the temperature measurement setup. FIG. 3B shows the corresponding thermal images of 1-layer hollow fibers and 1-layer coaxial fibers at $T_h$=150° C. FIG. 3C shows the temperature difference ($|T|$) of the $T_f$ and $T_h$ versus the $T_h$ for 2-layer hollow fibers and 2-layer coaxial fibers. Inset in (c) shows the temperature measurement setup. FIG. 3D shows the thermal images of 2-layer hollow fibers and 2-layer coaxial fibers at $T_h$=150° C. FIG. 3E shows the temperature difference ($|T|$) of the $T_f$ and $T_h$ versus the $T_h$ for a 2 mm thick CA sheet and a 1.8 mm thick cotton fabric. Inset in (e) shows the optical images of a CA sheet and a cotton fabric. FIG. 3F shows the corresponding thermal images of the CA sheet and the cotton fabric at $T_h$=150° C. FIG. 3G shows the temperature difference ($|\Delta T|$) of the $T_f$ and cold substrate ($T_s$) versus the $T_s$ for 5-layer hollow fibers and 5-layer coaxial fibers. Inset in (g) shows the temperature measurement setup. FIG. 3H shows the corresponding thermal images of 5-layer hollow fibers and 5-layer coaxial fibers at $T_s$=−15° C. FIG. 3I shows a schematic illustration of the thermal insulation mechanisms of the hollow and coaxial fibers.

FIGS. 4A-4E show thermal insulation properties of coaxial fiber mats with different layers. FIGS. 4A-4C show the thermal images of coaxial fiber mats with different layers at $T_h$=50, 100, and 150° C., respectively. FIG. 4D show the temperature difference ($|T|$) between the fiber surface and hot plate versus the hotplate temperature for different layers of coaxial fibers. FIG. 4E show the temperature difference ($|T|$) between the fiber surface and hot plate is plotted against layer number of the coaxial fiber mat.

FIGS. 5A-5O shows a demonstration of the thermal insulation application using the coaxial fibers. FIGS. 5A and 5B show photographs of a 2-layer coaxial fiber mat in the top view. FIG. 5C shows a toy house (16 cm×11.5 cm×13 cm) with the front side open was assembled for the demonstration of the building insulation. The 2-layer coaxial fiber mat was placed on top of the roof. FIGS. 5E and 5F show the thermal images of the toy house in a "hot weather" without and with the coaxial fiber mat on the roof, respectively. FIG. 5G shows photograph of the toy house in cold environments. A slab of dry ice (16 cm×12 cm×3 cm) carried by an aluminum tray was placed at the top create the "cold weather" around the toy house. FIGS. 5H and 5I show the thermal images of the toy house in a "cold weather" without and with the coaxial fiber mat on the roof, respectively. The thermal images in FIGS. 5E, 5F, 5H, and 5I were taken after 20 min stabilization. FIG. 5J-5L display the impact of the coaxial fibers for the temperature change with time of the "Picture", "Flower", and "Cat" (as shown in FIG. 5D), respectively in the "hot weather". FIG. 5M-5O display the impact of the coaxial fibers for the temperature change with time of the "Picture", "Flower", and "Cat", respectively in the "cold weather."

FIGS. 9A-9D show the cross-sectional SEM images of a smaller CA/PAA hollow (FIG. 9A) and coaxial fibers (FIG. 9B), spun from the nozzle with coaxial 26G inner and 19G outer channels, respectively. Cross-sectional SEM image of a larger CA/PAA hollow (FIG. 9C) and coaxial fibers (FIG. 9D), spun from the nozzle with coaxial 21G inner and 15G outer channels, respectively.

FIG. 10 shows specific tensile strength versus strain curves of the CA/PAA hollow and coaxial fibers.

DETAILED DESCRIPTION OF THE INVENTION

I. General

Figure 1F:
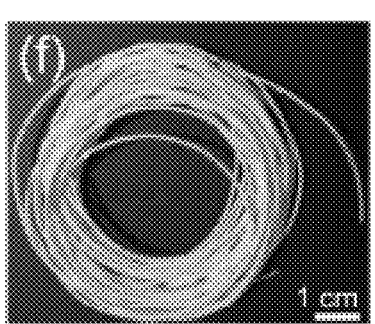

The present invention provides a coaxial fiber comprising a cellulose fiber and an aerogel, and methods of making the coaxial fiber. The present invention also provides a method for insulating and maintaining a temperature difference between two different zones have different temperatures.

II. Definitions

Unless specifically indicated otherwise, all technical and scientific terms used herein have the same meaning as commonly understood by those of ordinary skill in the art to which this invention belongs. In addition, any method or material similar or equivalent to a method or material described herein can be used in the practice of the present invention. For purposes of the present invention, the following terms are defined.

"A," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

"Coaxial fiber" refers to a three-dimensional cylindrical fiber which may comprise two or more different types materials. The coaxial fiber can have a porous fiber exterior and a hollow interior. The porous fiber exterior can be any suitable textile fiber, such as, but not limited to, cellulose fiber, cotton, wool, silk, nylon, or rayon. The hollow interior may be comprised of any suitable aerogel such as, but not limited to, silica aerogel, alumina aerogel, carbon aerogel, or cellulose aerogel.

"Cellulose fiber" refers to fibers comprising cellulose, derived from either cellulose ethers, esters, or both. Cellulose fibers can either be natural or manufactured. Natural cellulose fibers may further comprise hemicellulose, lignin, and pectin. Manufactured cellulose fibers may further comprise other polymers such as, but not limited to polyacrylic acid.

"Aerogel" refers to a porous solid material with high porosity and low density. The pores of the aerogel allow for passage of gas or liquid phase molecules through the material. Representative aerogels include inorganic aerogels (such as silicon-derived aerogels), organic aerogels (such as carbon-derived aerogels), and inorganic/organic hybrid aerogels. Organic aerogels include, but are not limited to cellulose aerogels, urethane aerogels, resorcinol formaldehyde aerogels, polyolefin aerogels, melamine-formaldehyde aerogels, phenol-furfural aerogels and polyimide aerogels.

"Cellulose nanofibrils" (CNF) refers to a type of nanocellulose wherein the nanofibrils are formed from cellulose. The cellulose may be chemically modified or unmodified. Nanocellulose refers to a relatively crystalline cellulose in either rod-like or fibril-like forms with nanometer scale lateral dimensions and hundreds to thousands of nm in lengths.

"Porosity" refers to a measure of the void, or empty, spaces in a material. Porosity measures the volume of voids over the total volume, between 0 and 1, or can also be reported as a percentage between 0% and 100%, wherein the higher value indicates a higher porosity.

"Tensile strength" refers to how much stress a material can withstand before breaking. The material is tested by being stretched or pulled. The units for tensile strength can be in pressure, such as kPa, or any unit conversion equivalent.

"Suspension" refers to a heterogenous mixture wherein the solid particles are not dissolved, and instead, dispersed through a liquid solution.

"Wet-spinning" refers to a process to create polymer fibers, wherein the polymers need to be dissolved in a solvent for spinning. The polymer solution is then extruded through a spinneret into a liquid bath to coagulate and form fibers. In some examples, the liquid bath, includes, but is not limited to, water.

"Freeze-drying" refers to a low temperature dehydration process, and in some embodiments is referred to as lyopholisation or cryodesiccation. Freeze-drying refers to a process wherein liquid is removed from the material by first freezing the liquid in the product, and then lowering the pressure and removing the frozen liquid by sublimation.

"Container" refers to vessel which can be used for storing or transporting an object. Examples of containers include, but are not limited to, a thermos, shipping containers, storage boxes, and lunch boxes.

"Wearable object" refers to clothing or accessories which can be worn by a human, animal, or mammal. Examples of wearable objects include, but are not limited to, jackets, gloves, hats, watches, and activity trackers.

III. Coaxial Fiber

In some embodiments, the present invention provides a coaxial fiber comprising a cellulose fiber comprising an exterior and a hollow interior; and an aerogel occupying the hollow interior of the cellulose fiber.

The cellulose fibers useful for the present invention can be any cellulose fiber known by one of skill in the art. The cellulose fibers can be natural cellulose fibers, or manufactured cellulose fibers. Natural cellulose fibers include, but are not limited to cotton, flax, hemp, jute, and ramie. Manufactured cellulose fibers include, but are not limited to rayon and viscose.

The cellulose fibers of the present invention can have any suitable diameter know by one of ordinary skill in the art. In some embodiments, the cellulose fibers have a diameter of 300 μm to 800 μm. In some embodiments, the cellulose fibers have a diameter of 400 μm to 700 μm. In some embodiments, the cellulose fibers have a diameter of about 500 μm.

$T_h$ cellulose fibers of the present invention can have any suitable density known by one of ordinary skill in the art. In some embodiments, the density of the cellulose fiber is about 0.2 to 0.8 g/cm$^3$. In some embodiments, the density of the cellulose fiber is about 0.4 to 0.6 g/cm$^3$. In some embodiments, the density of the cellulose fiber is about 0.48 g/cm$^3$.

The cellulose fibers of the present invention can have any suitable thermal conductivity known by one of skill in the art. In some embodiments, the thermal conductivity is less than 1.0 W/mK. In some embodiments, the thermal conductivity is less than 0.5 W/mK. In some embodiments, the thermal conductivity is about 0.05 W/mK to about 0.30 W/mK. In some embodiments, the thermal conductivity is about 0.10 W/mK to about 0.20 W/mK. In some embodiments, the thermal conductivity is about 0.11 W/mK.

The cellulose fibers of the present invention can have any suitable tensile stress known by one of ordinary skill in the art. The specific tensile strength is a material's strength over its density. Tensile strength is measured by pulling a material to its breaking point while the force and elongation of the material is measured throughout the experiment. The measurements are general obtained from a universal testing machine (UTM). In some embodiments, the tensile stress is about 3 MPa to 10 MPa. In some embodiments, the tensile stress is about 4 MPa to 8 MPa. In some embodiments, the tensile stress is about 4 MPa to 6 MPa. In some embodiments, the tensile stress is about 5.9 MPa.

In some embodiments, the cellulose fibers are wet-spun from cellulose acetate. In some embodiments, the cellulose fiber further comprises polyacrylates, poly acrylic acid, poly(methyl methacrylate), polyacrylamide, hydroxyethyl methacrylate, or a combination thereof. In some embodiments, the cellulose fiber further comprises poly acrylic acid.

The polyacrylic acid (PAA) of the present invention can have any suitable molecular weight known by one of ordinary skill in the art. In some embodiments, the molecular weight of PAA is at least 3,000 kDa. In some embodiments, the molecular weight of PAA is at least 4,000 kDa. In some embodiments, the molecular weight of PAA is about 3,000 kDa to 10,000 kDa. In some embodiments, the molecular weight of PAA is about 3,000 kDa to 8,000 kDa. In some embodiments, the molecular weight of PAA is about 3,000 kDa to 5,000 kDa. In some embodiments, the molecular weight is about 4,000 kDa.

The cellulose fibers of the present invention can have any suitable ratio of cellulose to polyacrylic acid known by one of ordinary skill in the art. In some embodiments, the cellulose fiber comprises a ratio of about 80:20 to 99:1 of cellulose to polyacrylic acid. In some embodiments, the cellulose fiber comprises a ratio of about 90:10 to 99:1 of cellulose to polyacrylic acid. In some embodiments, the cellulose fiber comprises a ratio of about 90:10, 92:8, 95:5, or 99:1 of cellulose to polyacrylic acid. In some embodiments, the cellulose fiber comprises a ratio of about 92:8 of cellulose to polyacrylic acid.

The cellulose fibers of the present invention can be porous. Porosity can be measured by mercury porosimetry, helium pycnometry, image analysis and water absorption as known by one of skill in the art. For example, imaging analysis such as SEM imaging can be used to determine fiber density $(\rho_f)$, wherein porosity $(P_f)$ is calculated as $P_f = 1 - \rho_f / \rho_b$, where $\rho_b$ is the bulk density of cellulose (1.3 g/cm$^3$). In some embodiments, the cellulose fibers have at least 60% porosity. In some embodiments, the cellulose fibers have at least 63% porosity. In some embodiments, In some embodiments, the cellulose fibers have about 90% to 99% porosity. In some embodiments, the cellulose fibers have about 93% to 99% porosity.

In some embodiments, the cellulose fiber exterior surrounding the aerogel comprises pores. The pore diameter can be any suitable size known by one of skill in the art. For example, the pores can have various sizes on three orders of magnitude, such as tens of micrometers, hundreds of nanometers, and tens of nanometers. In some embodiments, the pores have a size of about 10 nm to about 65 μm. In some embodiments, the pores have a size of about 20 nm to about 40 μm. In some embodiments, the pores have a size of about 20 nm to about 30 μm.

The aerogels of the present invention can be any suitable aerogel known by one of ordinary skill in the art. In some embodiments, the aerogel comprises silica aerogel, alumina aerogel, carbon aerogel, cellulose aerogel, or a combination thereof. In some embodiments, the aerogel comprises silica, carbon, cellulose or a combination thereof. In some embodiments, the aerogel comprises a cellulose nanofibril (CNF) aerogel.

The coaxial fiber of the present invention can have any suitable outer diameter known by one of ordinary skill in the art. In some embodiments, the coaxial fiber has a diameter of about 250 μm to about 3000 μm. In some embodiments, the coaxial fiber has a diameter of about 300 μm to about 2000 μm. In some embodiments, the coaxial fiber has a diameter of about 500 μm to about 1500 μm. In some embodiments, the coaxial fiber has a diameter of about 1000 μm.

In some embodiments, the coaxial fiber has a porosity of at least 70%. In some embodiments, the coaxial fiber has a porosity of at least 80%. In some embodiments, the coaxial fiber has a porosity of at least about 85%. In some embodiments, the coaxial fiber has a porosity of at least about 70% to 99%. In some embodiments, the coaxial fiber has a porosity of at least about 80% to 95%. In some embodiments, the porosity it about 85%.

The coaxial fiber of the present invention can have any suitable density known by one of ordinary skill in the art. In some embodiments, the coaxial fiber has a density of less than 1.0 g/cm$^3$. In some embodiments, the coaxial fiber has a density of about 0.1 g/cm$^3$ to about 1 g/cm$^3$. In some embodiments, the coaxial fiber has a density of about 0.1 g/cm$^3$ to about 0.5 g/cm$^3$. In some embodiments, the coaxial fiber has a density of about 0.1 g/cm$^3$ to about 0.3 g/cm$^3$. In some embodiments, the coaxial fiber has a density of about 0.2 g/cm$^3$.

In some embodiments, the coaxial fiber has a specific tensile strength of about 10 MPa·g/cm$^3$ to about 100 MPa·g/cm$^3$. In some embodiments, the coaxial fiber has a specific tensile strength of about 10 MPa·g/cm$^3$ to about 50 MPa·g/cm$^3$. In some embodiments, the coaxial fiber has a specific tensile strength of about 20 MPa·g/cm$^3$ to about 30 MPa·g/cm$^3$. In some embodiments, the coaxial fiber has a specific tensile strength of about 21 MPa·g/cm$^3$ to about 26 MPa·g/cm$^3$.

In some embodiments, the present invention provides a coaxial fiber comprising a cellulose fiber comprising an exterior and a hollow interior; and an aerogel occupying the hollow interior of the cellulose fiber, wherein: the cellulose fiber comprises pores having a size of about 20 nm to about 40 μm; the aerogel comprises a cellulose nanofibril (CNF) aerogel; and the coaxial fiber has an outer diameter of about 500 μm to about 1500 μm, porosity of about 85%, a density of about 0.2 g/cm$^3$, and a specific tensile strength of about 21 MPa g/cm$^3$ to about 26 MPa g/cm$^3$.

IV. Method for Preparing Coaxial Fiber

In some embodiments, the present invention provides a method for preparing a coaxial fiber, the method comprising: (a) wet-spinning an organic solution comprising cellulose acetate and polyacrylic acid on the exterior of a water core to form a cellulose fiber comprising an interior and exterior, wherein the interior is filled with water; (b) removing the water to form a hollow cellulose fiber; (c) injecting an aqueous cellulose nanofibril suspension into the hollow cellulose fiber to form a cellulose fiber comprising an aqueous cellulose interior; and (d) freeze-drying the cellulose fiber comprising an aqueous cellulose interior to form a cellulose fiber comprising a nanofibril aerogel interior, thereby forming the fiber.

The coaxial fibers of the present invention can be prepared by wet-spinning with a spinneret device. The spinneret may have different gauge needle sizes in order to prepare a water core and cellulose fiber sheath. The polymer solution and water was loaded into syringes, such as Fusion 200 syringe pumps. The polymer solution is loaded into syringe pumps with the bigger gauge needles, whereas water was loaded into the syringe pumps with smaller needles in order to form the cellulose fiber exterior and water core, which would later be dehydrated in order to form a hollow core. The fibers were continuously spun into a water bath, and then collected on a winding spool.

In some embodiments, the wet-spinning speed is about 100 to 600 μl min$^{-1}$. In some embodiments, the wet-spinning speed is about 200 to 400 μl min$^{-1}$. In some embodiments, the wet-spinning speed is 300 μl min$^{-1}$.

The organic solution for preparing the coaxial fiber of the present invention can comprise any suitable organic solvent known by one of skill in the art. In some embodiments, the organic solution comprises dimethylacetamide, dimethyl formamide, dimethyl sulfoxide, N-methyl-2-pyrrolidone, acetone, acetonitrile, methanol, ethanol, isopropanol or a combination thereof. In some embodiments, the organic solution comprises dimethylacetamide, dimethyl formamide, dimethyl sulfoxide, N-methyl-2-pyrrolidone, or a combination thereof. In some embodiments, the organic solution comprises dimethylacetamide. In some embodiments, the organic solution comprises dimethylacetamide, cellulose acetate, and polyacrylic acid.

The cellulose acetate of the present invention can have any suitable molecular weight known by one of ordinary skill in the art. In some embodiments, the cellulose acetate has a molecular weight of at least 250 Da. In some embodiments, the cellulose acetate has a molecular weight of at least 500 Da. In some embodiments, the cellulose acetate has a molecular weight of about 1 kDa to 100 kDa. In some embodiments, the cellulose acetate has a molecular weight of about 25 kDa to 75 kDa. In some embodiments, the cellulose acetate has a molecular weight of about 50 kDa.

The molecular weight of the polyacrylic acid (PAA) can be any suitable molecular weight as described above. In some embodiments, the molecular weight of PAA is about 4,000 kDa.

The organic solution can comprise any suitable ratio of cellulose acetate to polyacrylic acid as known by one of ordinary skill in the art. In some embodiments, the organic solution comprises about 50:1 to about 10:5 w/w of cellulose acetate to polyacrylic acid. In some embodiments, the organic solution comprises about 40:1 to about 15:5 w/w of cellulose acetate to polyacrylic acid. In some embodiments, the organic solution comprises about 30:1 to about 20:5 w/w of cellulose acetate to polyacrylic acid. In some embodiments, the organic solution comprises about 30:1, 25:1, 23:2, or 20:5 w/w of cellulose acetate to polyacrylic acid. In some embodiments, the organic solution comprises about 23:2 w/w of cellulose acetate to polyacrylic acid.

In some embodiments, the organic solution comprises about 10% to 30% by weight of 23:2 w/w of cellulose acetate to polyacrylic acid. In some embodiments, the organic solution comprises about 10% to 20% by weight of 23:2 w/w of cellulose acetate to polyacrylic acid. In some embodiments, the organic solution comprises about 15%, 16%, 17%, 18%, or 19% by weight of 23:2 w/w of cellulose acetate to polyacrylic acid. In some embodiments, the organic solution comprises about 16% by weight of 23:2 w/w of cellulose acetate to polyacrylic acid.

The method for preparing a coaxial fiber can further comprise additional steps as known by one of ordinary skill in the art. In some embodiments, the method further comprises after step (a), soaking the cellulose fiber in a water bath for about 3 hours to 36 hours. In some embodiments, the method further comprises after step (a), soaking the cellulose fiber in a water bath for about 10 hours to 24 hours. In some embodiments, the method further comprises after step (a), the step of (a1) soaking the cellulose fiber in a water bath for about 15 hours.

Removing the water in step (b) of the method can comprise any suitable water removal method known by one of skill in the art. In some embodiments, removing the water comprises air-drying or freeze-drying the cellulose fiber. In some embodiments, removing the water in step (b) comprises freeze-drying the cellulose fiber, thereby forming the hollow cellulose fiber.

The aqueous cellulose nanofibrils suspension of step (c) can have any suitable concentration of cellulose. In some embodiments, the aqueous cellulose nanofibril suspension comprises about 0.01% to 10% by weight of cellulose. In some embodiments, the aqueous cellulose nanofibril suspension comprises about 0.05% to 5% by weight of cellulose. In some embodiments, the aqueous cellulose nanofibril suspension comprises about 0.1% to 10% by weight of cellulose. In some embodiments, the aqueous cellulose nanofibril suspension comprises about 0.1% to 1% by weight of cellulose. In some embodiments, the aqueous cellulose nanofibrils suspension comprises about 0.4%, 0.5%, 0.6%, 0.7%, 0.8% or 0.9% by weight of cellulose. In some embodiments, the aqueous cellulose nanofibril suspension comprises about 0.7% by weight of cellulose.

In some embodiments, the present invention provides a method for preparing a coaxial fiber, the method comprising: (a) wet-spinning an organic solution comprising dimethyl-acetamide, cellulose acetate, and polyacrylic acid, on the exterior of a water core to form a cellulose fiber comprising an interior and exterior, wherein the interior is filled with water, and wherein the organic solution comprises about 16% by weight of 23:2 w/w of cellulose acetate to poly-acrylic acid; (a1) soaking the cellulose fiber in a water bath for about 15 hours; (b) removing the water to form a hollow cellulose fiber, wherein removing the water comprises freeze-drying the cellulose fiber; (c) injecting an aqueous cellulose nanofibril suspension comprising about 0.7% by weight of cellulose into the hollow cellulose fiber to form a cellulose fiber comprising an aqueous cellulose interior; and (d) freeze-drying the cellulose fiber comprising an aqueous cellulose interior to form a cellulose fiber comprising a nanofibril aerogel interior, thereby forming the fiber.

V. Method for Maintaining Temperature

In some embodiments, the present invention provides a method of maintain a temperature differential between a first zone having a first temperature, and a second zone having a second temperature, comprising: separating the first zone and the second zone using a plurality of coaxial fibers of the present invention; and applying thermal energy to the first zone such that the first temperature increases while the second temperature of the second zone increases by a lesser amount.

The coaxial fibers of the present invention can be used for separating, and maintaining, different temperatures between two discrete zones. In some embodiments, the first zone is a room, house exterior, outdoor environment, forest, hiking trail, or earth's atmosphere. In some embodiments, the second zone is a container, a wearable object, clothing, gloves, heat-protective gear, house, building, airplane, trailer, or aircraft. In some embodiments, the second zone is a container, a wearable object, clothing, gloves, or heat-protective gear.

The method of maintain a temperature differential between the first zone and a second zone can be performed at any suitable temperature range known by one of ordinary skill in the art. In some embodiments, the method can be performed from a temperature range of about −100° C. to 300° C. In some embodiments, the method can be performed from a temperature range of about −50° C. to 200° C. In some embodiments, the method can be performed from a temperature range of about −20° C. to 150° C. In some embodiments, the method can be performed from a temperature range of about 0° C. to 100° C.

VI. Examples

Example 1. Methods of Producing Coaxial Fibers

Materials: Cellulose acetate (CA-398-30L-HV, $M_n$=50 kDa) was purchased from Eastman Chemical Company. Poly (acrylic acid) (PAA, $M_n$=4,000 kDa) was purchased from Sigma Aldrich. Dimethylacetamide (DMAc) was purchased from EMD Chemicals. Cellulose nanofibrils (CNFs) were derived from rice straw cellulose via combined TEMPO-mediated oxidation and mechanical blending, as reported previously. Briefly, 1.0 g of rice straw cellulose was oxidized in an aqueous solution containing 0.016 g of TEMPO, 0.1 g of NaBr and 5 mmol NaClO at pH 10.0. After centrifugation and dialysis, the TEMPO-oxidized cellulose was blended (Vitamix 5200, Vita-Mix Corporation) at 37,000 rpm for 30 min, centrifuged (5,000 rpm, 15 min) to collect the supernatant to be concentrated using a rotary evaporator (Buchi Rotavapor R-114) to 0.7 wt % and stored at 4° C. for preparation of aerogel fibers.

Preparation of hollow CA/PAA fibers: PAA (0.2g) was first vigorously stirred in DMAc (13.1 g) for 1 h, then CA (2.3 g) was added to prepare 16 wt % concentration of 23:2 w/w CA-PAA w/w mixture and stirred for 4 h. Each of the core (water) and shell solutions (CA/PAA in DMAc) was loaded into 10 mL syringes and spun through respective outer (17 G) and inner (23 G) stainless steel needles at the same 300 $\mu$l min$^{-1}$ rate using Fusion 200 syringe pumps (Chemyx Inc.). The fibers were continuously spun into a water bath at ambient temperature and collected on a 50 mm diameter winding spool at 2 to 4 m min$^{-1}$ line speed. The as-spun wet fibers were soaked in a water bath for 15 h to remove residual DMAc, then frozen (−20° C., 15 h) and lyophilized (−50° C., 4 d, Free Zone 1.0 L Benchtop Freeze Dry System, Labconco, Kansas City, Mo.) to yield the hollow fibers.

Preparation of CA/PAA-sheath CNF-aerogel core coaxial fibers: The as-prepared CNF aqueous dispersion at 0.7 wt % was stirred for 10 min and loaded into a 10 mL syringe. The CNF dispersion was then injected into the CA/PAA hollow fibers with lengths up to 8 m using a Fusion 200 syringe pumps (Chemyx Inc.) at 300 $\mu$l min$^{-1}$. The aq. CNF containing CA/PAA hollow fibers were then frozen (−20° C., 15 h) and lyophilized (−50° C., 4 d, Free Zone 1.0 L Benchtop Freeze Dry System, Labconco, Kansas City, Mo.) to yield aerogel core coaxial fibers.

Figure 1G:
Figure 1H:
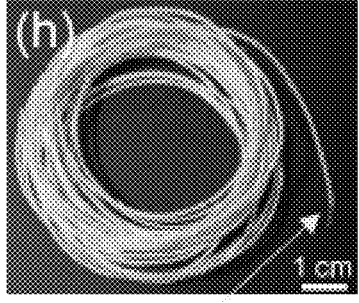
Figure 1I:
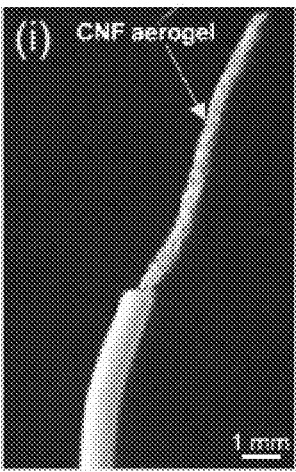
Figure 7A:
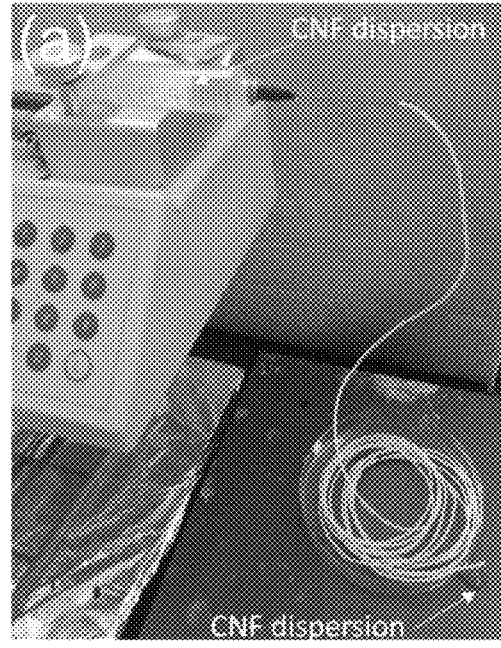
FIG. 7A shows filling aqueous CNF dispersion (0.7 wt %) into a 4 m-length CA/PAA hollow fiber.
Figure 7B:
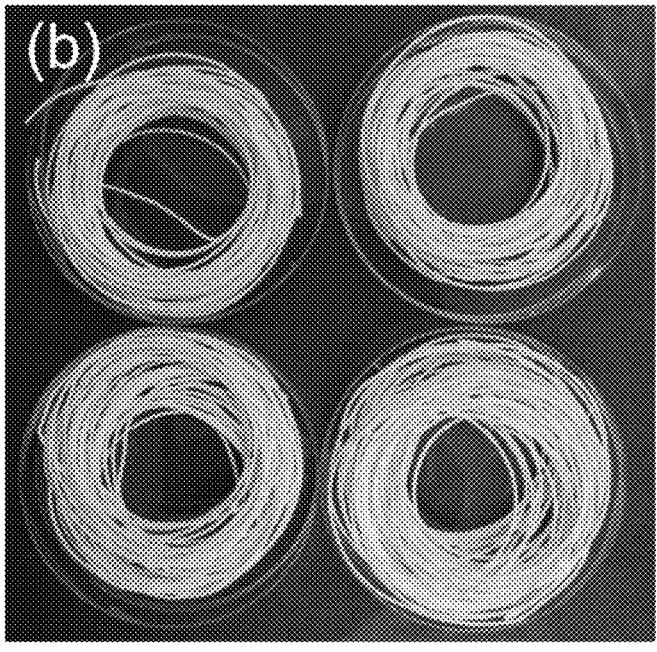
FIG. 7B shows coaxial fibers containing CNF aerogel core following freezing and freeze drying.
Figure 8:
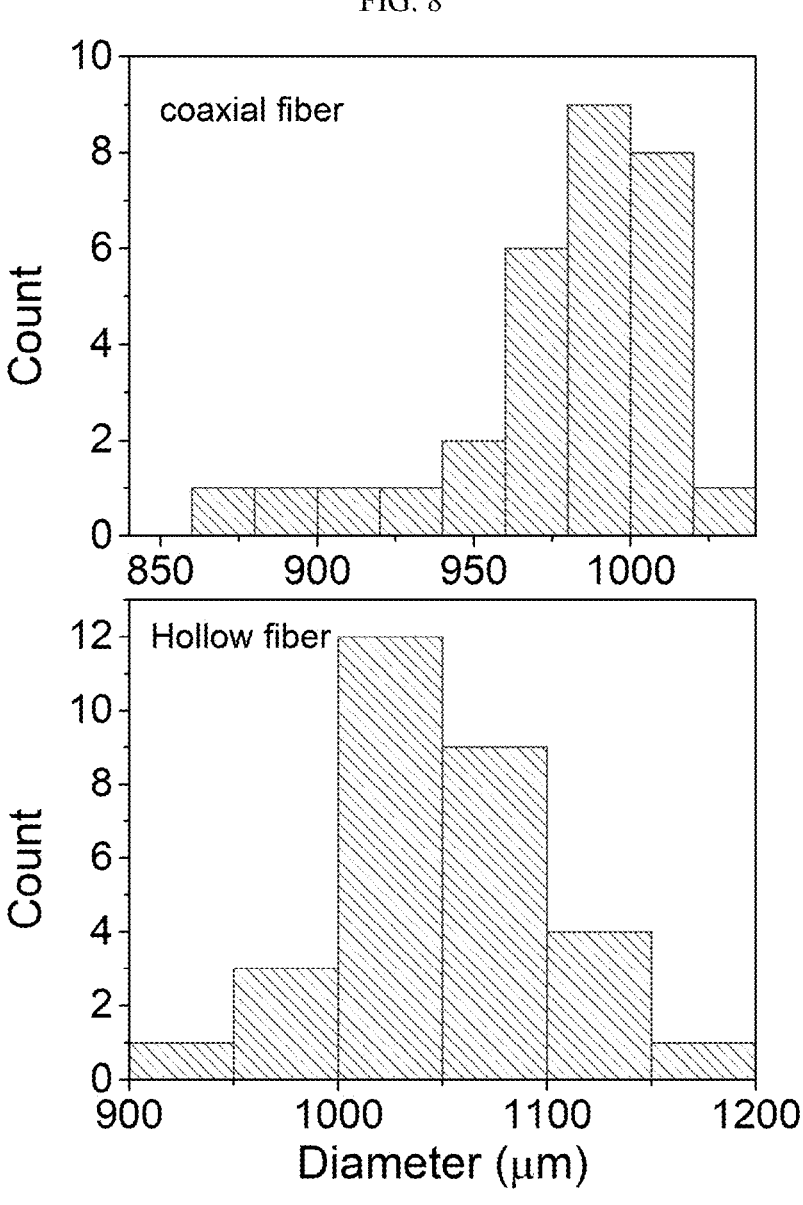
FIG. 8 shows the diameter distributions of CA/PAA hollow fibers and coaxial fibers. The diameters are measured from 30 locations of each kind of fibers.

FIG. 1E illustrates a coaxial wet-spinning and post-treatment process to produce a hollow fiber, or circular sheath, to be filled with aqueous CNF aerogel precursor. The spinning nozzle consists of coaxial inner and outer channels constructed with 23 and 17 gauge (G) needles, respectively. The hollow fiber was first wet-spun using a cellulose acetate (CA) dominant spin dope in dimethylacetamide (DMAc) for the outer channel and water for the center. A high molecular weight (4,000 kDa) poly (acrylic acid) (PAA) was added to CA at a 23:2 w/w CA/PAA ratio and spun into a water coagulation bath where the water inside and outside of the hollow fiber extracted DMAc, causing simultaneous phase inversion in the sheath and enabling continuous collection of single CA/PAA filament over 10 m long. The ease in which uniform fiber was spun continuously validated the potential for scaled-up production. The as-spun hollow fiber was immersed in water for an additional 15 h to remove residual DMAc while keeping the core filled with water. The water-filled hollow fiber was frozen (−20° C., 15 h), then freeze-dried in a lyophilizer (−50° C. for 2 d) into a uniform hollow fiber template for infusion with aerogel precursor. Aqueous CNF dispersion (0.7 wt %) was then injected into the hollow fiber at 300 $\mu$l min$^{-1}$ (FIG. 7A), followed by freezing (−20° C., 15 h), then freeze-drying (−50° C. for 2 d) to form continuous aerogel in the core. FIGS. 1F-1G show the final hollow CA/PAA fibers whereas the aerogel core was sufficiently strong to be pulled out from the hollow fiber (FIG. 1H-1I). Moreover, the fabrication process is streamlined to allow continuous production of a large number of coaxial fibers (FIG. 7B). These hollow and coaxial fibers were relatively uniform in their lateral dimensions, as shown by their respective average outer diameter of 1010.9±50.7 $\mu$m and 905.9±38.0 $\mu$m on 30 locations along two representative fibers (FIG. 8).

Example 2. Coaxial Fibers

Characterization: The height of CNFs was imaged by atomic force microscopy (AFM). 10 $\mu$L CNF suspension (0.0001 wt %) was deposited onto a freshly cleaved mica surface, air-dried, scanned (Asylum-Research MFP-3D) in air under ambient condition using tapping mode with OMCL-AC160TS standard silicon probes. CNFs was imaged by transmission electron microscopy (TEM) on a JEM-1230 electron microscope (JEOL) to determine widths and lengths. CNF suspension (0.0001 wt %) was deposited onto glow-discharged carbon-coated TEM grids (Ted Pella Inc., Redding, CA) with the excess liquid being removed by blotting with a filter paper after 10 min. The specimens were then negatively stained with 2% phosphotungstic acid solution. Scanning electron microscopy (SEM) was performed on the cross section, inner and outer surface of the fibers using a Quattro S machine at high vacuum mode (Thermo Scientific). All samples were sputtered with the gold of 3-5 nm thickness before imaging. The diameter of the micro-voids, sub-micron pores, and nanopores on the inner and outer surface of the CA/PAA sheath were measured and averaged from 30 pores by ImageJ. The cross-section dimension of the fibers was measured from SEM images, and their mass was measured by a balance with 0.1 mg resolution, to calculate the fiber density ($\rho_f$). The porosity of the fibers ($P_f$) was calculated as $P_f = 1 - \rho_f/\rho_b$, where $\rho_b$ is the bulk density of cellulose equals 1.3 g cm$^{-3}$. The mechanical behavior of hollow CA/PAA fiber, CA/PAA-wrapped CNF aerogel fibers was measured by a 5566 Instron universal testing machine at a constant 5% min$^{-1}$ strain rate. Fiber samples in 3 cm length, were coated with epoxy adhesive at each end to protect them from damage during clamping. The tensile strength, Young's modulus, and elongation were collected from at least 10 samples for each formulation, and their average values and standard deviation are reported. As it is difficult to directly measure the thermal conductivity of a single fiber, a representative sample containing 4 layers of tightly packed fibers was prepared; each layer contains 10 unidirectional fibers. The thermal conductivities of the samples were estimated by measuring layered fiber arrays using a Transient Hot Disk TPS 2500S meter. For comparison, a CNF aerogel sample (diameter 11 cm, thickness: 1 mm) was also prepared and thermal conductivity was measured by the same meter. Thermal images of the fibers were taken using an A320 thermographic camera (FLIR Systems, Inc.) at a frame rate of 10 Hz. The working distance between the camera lens and the sample is approximately 22 cm. The representative sample is constructed containing layers of tightly packed fibers; each layer contains 10 unidirectional fibers. The fiber length of interest is 2.5 cm. During the measurements, the ambient temperature is around 26° C. The thermal images were taken when the fiber surface temperature was stable.

Figure 2A:
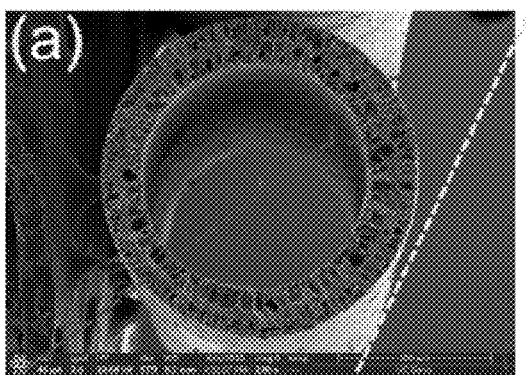
FIGS. 2A-2L show morphologies and microstructures of hollow and coaxial fibers by SEM.
Figure 2B:
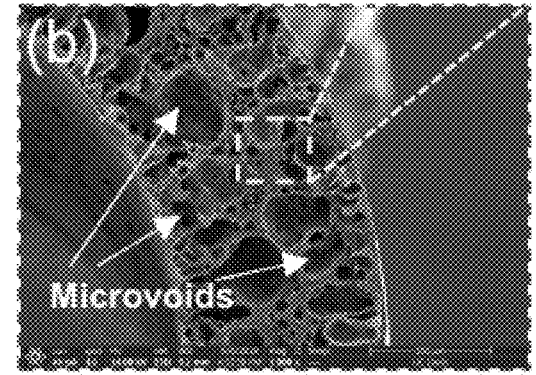
Figure 2C:
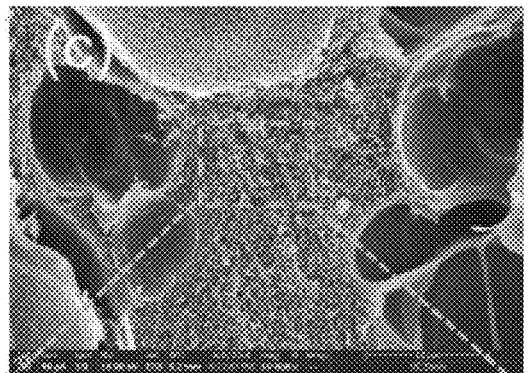
Figure 2D:
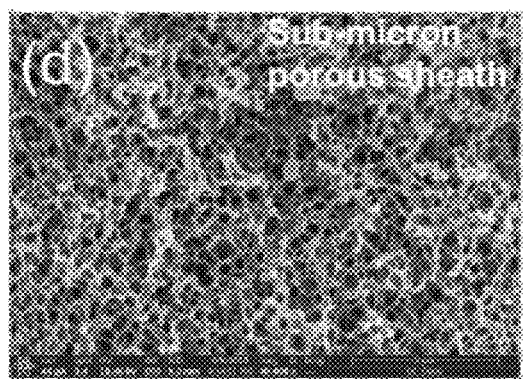
Figure 2E:
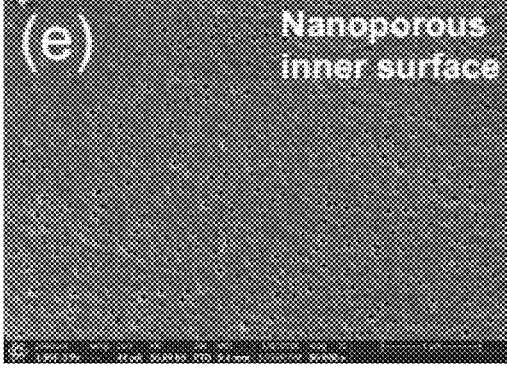
Figure 2F:
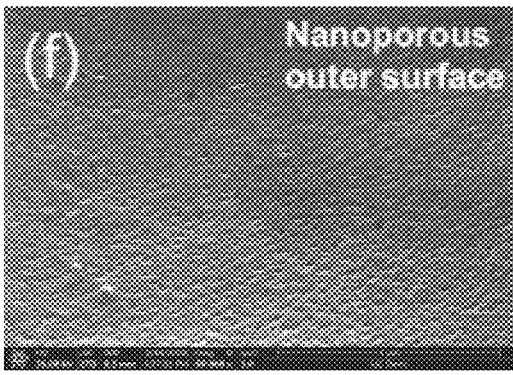

The SEM of the hollow fiber cross-section showed an average outer diameter of 992.7 (±46.6) $\mu$m with an average wall thickness of 155.7 (±21.2) $\mu$m (FIGS. 2A-2F). The wall is characterized by a double concentric layer of porous structures (FIG. 2A) from phase inversion caused by water exposure from both inside and outside of the hollow fiber during immersion precipitation and coagulation. The porous structures are thought to originate from the combination of phase separation and mass transfer among CA/PAA (polymer), DMAc (solvent), and water (coagulant) during phase inversion. The microvoids in the hollow fiber wall were several to tens of micrometers (average value: 14.5±13.1 μm) in widths in both inner and outer layers (FIG. 2B-2C). Further enlargements of the hollow fiber wall showed the additional porous morphology consisting of sub-micron pores with an average diameter of 133 (±49) nm (FIG. 2D) and even smaller nanopores on both inner (24.8±5.2 nm) and outer (25.8±5.0 nm) surfaces (FIG. 2E-2F). Therefore, the sheath contains multiscale porous structure in three orders of magnitude levels, i.e., tens of μm wide microvoids surrounded by numerous two order magnitude smaller sub-micron pores across the wall thickness and even smaller nanopores on both the inner and outer surfaces. This porous sheath is critical to mass transfer of water and ice sublimation during lyophilization from the core, enabling the formation of CNF aerogels in the core. The formation of hierarchical pores in the hollow fiber wall is attributed to DMAc-water liquid-liquid demixing and mass transfer in the overall phase separation process. The thin nanoporous inner and outer skins are thought to be formed with fast coagulation or instantaneous demixing with water inside and outside the hollow fibers. The densely packed skins limit solvent outflow to facilitate droplet nucleation and sub-micron pore formation in the sheath where the CA/PAA/DMAc mixture phase separate into a solvent-rich or polymer-lean phase and a polymer-rich phase to minimize the Gibbs free energy of mixing. The microvoids in the sheath are likely formed by two generally accepted mechanisms: (1) diffusion aided by the Marangoni effect, i.e., mass transfer along an interface between two fluids due to surface tension gradient; (2) local surface instability, skin rupture and solvent intrusion. The sub-micron pores may originate from droplets of the solvent-rich phase that grows as a continuous entity as long as the solution beyond the droplet boundary is stable.

Figure 2G:
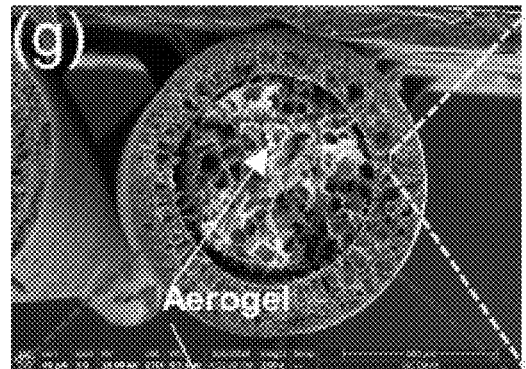
Figure 2H:
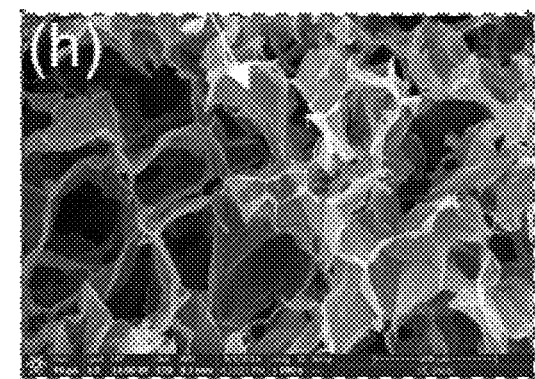
Figure 2I:
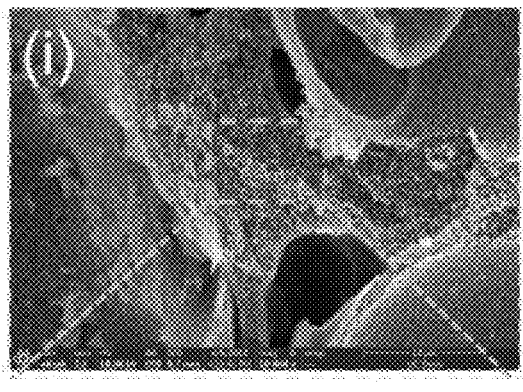
Figure 2J:
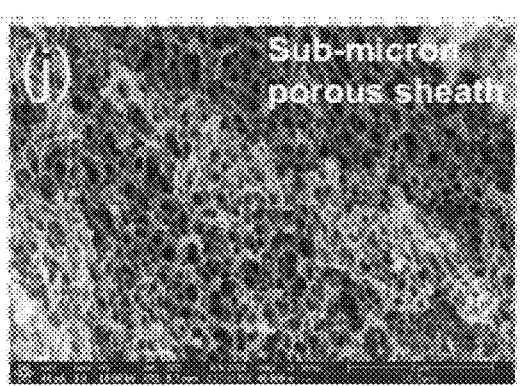
Figure 2K:
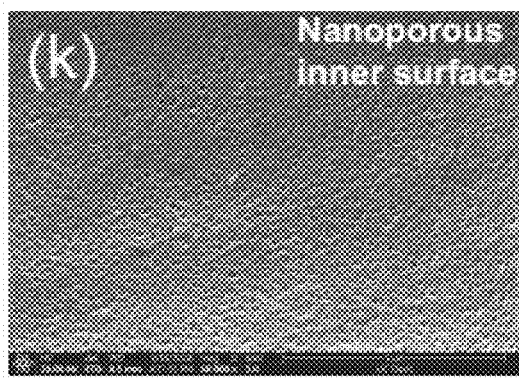
Figure 2L:
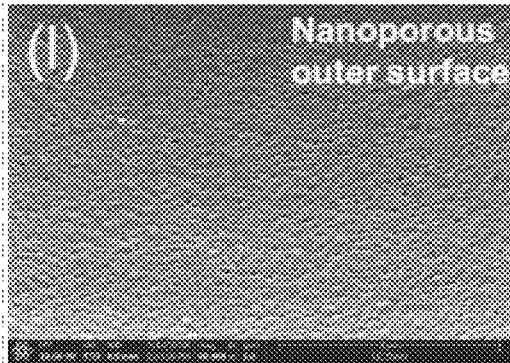

Following the injection of aq. CNF dispersion into the hollow fiber and the subsequent lyophilization, a coaxial microstructure with cellular CNF aerogel in the core and multiscale porous sheath is evident as shown in the cross-sectional SEM image in FIGS. 2G-2L. The coaxial fiber's outer diameter was 846.2±18.6 μm with a wall thickness of 118.9±14.9 μm, both smaller than the original hollow fiber and evident of shrinkage (FIG. 2A). While the outer diameter reduced by ca. 15%, the larger ca. 24% thinning of the wall resulted in ca. 13% reduction of inner core diameter, similar to the overall fiber width reduction. This consistent shrinkage of the core, wall thickness, and overall coaxial fiber dimension may be attributed to the compatibility between CNF in the core and CA-dominate sheath and their similar behaviors during freezing and lyophilization. The aerogel fully occupied the fiber core and appeared similar to neat aerogel, indicating neither ice nucleation nor lyophilization of the aq. CNF was affected by the sheath, a testament to its porous nature. The CNF aerogel is highly porous, containing 41.8±24.1 μm average pores (FIG. 2G-2H), nearly three times the microvoid sizes in the sheath. The double layer voids across the wall thickness range from several to tens of micrometers also remained unchanged. The average diameter of the nanopores in the sheath of the coaxial fiber was 138±55 nm (FIG. 2I-2J), comparable to that of the hollow fibers (133±49 nm). Furthermore, the pores on the inner and outer surfaces of the coaxial fiber had an average diameter of 26±5 nm and 25±4 nm, respectively (FIG. 2K-2L). Again, that the pore sizes of both sub-micron and nanopores in the sheath remain essentially unaltered with aerogel core gave evidence to their chemical similarity and compatibility.

The linear density measured from the mass of equal length (2.56 m) of the hollow fiber and coaxial fiber was 1.07 and 1.10 mg cm$^{-1}$, respectively, that were calculated into 0.48 and 0.2 g cm$^{-3}$ overall bulk densities or 63 and 85% porosity, respectively. The density of the CNF aerogel core was calculated from the mass difference between the coaxial fiber and the hollow fiber of equal lengths and the diameter of the CNF core measured from FIG. 2G to be 8.5 mg cm$^{-3}$, comparable to that of neat CNF aerogel and again confirming the CNF aerogel in the hollow fiber core to be unaffected by the sheath. Thus, the wet-spinning and post-injection of aq. CNF and lyophilization process (FIG. 1E) has been validated for the fabrication of CA/PAA-sheath CNF aerogel core coaxial fibers. Most significantly, the cellulose derivative and high porosity of the hollow fiber sheath was vital to facilitate the successful formation of CNF aerogel core. Furthermore, this approach is versatile to produce different sizes of hollow fibers (623.7±30.1 μm and 1297.6±80.4 μm) or coaxial fibers (588.3±19.3 μm and 1191.4±60.6 μm) using different size of coaxial needles (FIG. 9A-9D).

Both hollow and coaxial fibers exhibited typical plastic deformation stress-strain curves under tensile loading (FIG. 10) and good flexibility with 6.6±1.2% and 6.1±1.0% elongation, respectively. Most significantly, the coaxial fibers had a specific mechanical strength of 23.5±2.5 MPa g cm$^{-3}$, which is nearly twice as strong as the hollow fibers (12.3±1.9 MPa g cm$^{-3}$). Moreover, the coaxial fibers also show a more than twice specific Young's Modulus of 987.0±106.0 MPa g cm$^{-3}$, than that for hollow fibers (471.9±70.8 MPa g cm$^{-3}$). The mechanical robustness of the coaxial fiber is impressive, clearly confirming the protective and strengthening the role of the sheath in expanding the tensile strength and flexibility of neat aerogel, making these coaxial fibers more processable and durable.

TABLE 1

| Critical characteristics of biobased materials and aerogels | | | | |
| --- | --- | --- | --- | --- |
| Material type | Bulk density (g/cm$^3$) | Thermal conductivity W/(mK) | Tensile stress (MPa) | Elongation at break |
| Aeropectin bulk aerogel | 0.05 | 0.02 | — | — |
| AeroSF fiber | — | 0.022 | 0.95 | 0.08% |
| CNF bulk aerogel | 0.01 | 0.04 | 0.023 | 4% |
| CA hollow fiber | 0.48 | 0.11 | 5.9 | 6.6% |
| Coaxial aerogel fiber | 0.20 | 0.07 | 4.7 | 6.1% |

Example 3. Insulation Using Coaxial Fibers

The thermal insulation behavior of the hollow and coaxial fibers under both hot and cold conditions was observed. In the first experiment, 10 fibers were packed tightly and aligned unidirectionally to form a single layer mat in ca. 1 mm thickness on a hotplate (Inset in FIG. 3A), and infrared images were taken during heating from 30 to 150° C. The corresponding absolute temperature difference (|ΔT|) of the fiber surface (T$_f$) and the hotplate were plotted against the hotplate temperature (T$_h$), with higher |ΔT| indicating better thermal insulation performance. FIG. 3A shows consistently higher |ΔT| of in 1-layer coaxial fiber mat than 1-layer hollow fiber mat at any given T$_h$. As T$_h$ reached 150° C., the coaxial fiber mat temperature increases to 125° C. as opposed to 130° C. with the hollow fiber mat, showing better thermal insulation properties of the coaxial fiber mat over that of the hollow fibers. With 2-layer fiber mat, the $|\Delta T|$ doubled for both types of fibers at the same $T_h$ (FIG. 3C) and the higher increases in $|\Delta T|$ for double layers than single layers are due to the reduced thermal convection. At $T_h$=150° C., is 54 and 41° C. for coaxial and hollow fiber mat, respectively. The significantly better insulation perfor- mance of coaxial fibers than the hollow fibers is clearly attributed to the CNF aerogel in the core. Convective heat transfer in the hollow fibers is expected to be higher in the larger space within the hollow fiber (711.4±23.3 μm) for fluid movement which, in contrast, would be suppressed in the much smaller pore sizes (41.8±24.1 μm) in the CNF aerogel core, dramatically reducing and even ceasing con- vection among less connected pores. Moreover, the heat transfer by infrared radiation of the cellular wall in the CNF aerogel network was largely reduced in comparison to the air in the hollow fiber. The radiative thermal conductivity (Arad) in porous materials is given by:

$$\lambda_{rad}=16\sigma n^2 T^3/(3\rho K_s/\rho_s) \qquad (1)$$

where σ is the Stephan-Boltzmann constant (5.67×10⁻⁸ W m⁻² K⁻⁴), n is the refractive index (~1 for aerogels), T is the mean temperature within the porous material, and Ks is the extinction coefficient for the solid material, ρ and $\rho_s$ are the apparent and true density of the porous material, respec- tively. Based on this equation, $\lambda_{rad}$ contributes exponentially more to the total thermal conductivity as temperature increases, as shown in FIG. 3C. Thus, by introducing aerogel in the core, the insulation performance of the coaxial fiber is superior to that of the hollow fiber, especially at higher temperatures.

The temperature of 2-layer coaxial fiber mat with a thickness of 2 mm was measured to be 96° C., considerably lower than 109° C. for the hollow fiber mat at $T_h$=150° C. (FIGS. 3C-3D). The coaxial fiber mat also far out-performed two other cellulose materials of similar thickness: a single- layer transparent CA sheet cast from acetone (2 mm thick) and 3-layer cotton fabrics (1.8 mm thick) whose tempera- tures increase to 133 and 118° C., respectively at $T_h$=150° C. (FIG. 3E), and thermal images shown in FIG. 3F. While three layers of porous cotton fabrics display better insulation properties than the single sheet of non-porous transparent CA, cotton fabrics are less porous than hollow and coaxial fibers reported here, with 63% and 85% porosities, respec- tively. Comparing at the same $T_h$=80° C., the insulation performance ($|\Delta T|$=23° C.) of the 2-layer coaxial fibers is also superior to that ($|\Delta T|$=18° C.) of porous silk forbin fibers with aligned pores.

To simulate a cold environment, the 5-layer fiber mat was placed on top of a polystyrene substrate with a 3 cm thick slab of dry ice underneath (Inset in FIG. 3G). At −15° C. substrate temperature ($T_s$), the $|\Delta T|$ of the 5-layer coaxial fiber mat reduced to 10° C., higher than 4° C. of the hollow fiber mat, again affirming excellent thermal insulation of coaxial fibers over hollow fibers in a cold environment. Therefore, layered coaxial fiber mats have demonstrated to be highly thermally insulating under both hot and cold external environment.

FIG. 3I shows the heat transfer mechanism of both hollow and coaxial fibers. The thermal conductivity of the hollow fibers, $\lambda_{hollow}$ is expressed as $$\lambda_{hollow}=\lambda_{conv1}+\lambda_{cond1}+\lambda_{rad1} \qquad (2)$$

where $\lambda_{conv1}$, $\lambda_{cond1}$, and $\lambda_{rad1}$ are is the respective heat transfer by convection, conduction, and radiation. The thermal conductivity of hollow fibers is drastically lower than solid fibers as air has much smaller thermal conductivity than solids. The multi-scale porous structure with a high 63% porosity in the hollow fiber sheath is critical in further reducing the overall heat transfer. First, the larger ca. 14.5 μm wide microvoids surrounded by well inter-connected sub-micron (ca. 133 nm) and ca. 25-26 nm pores signifi- cantly reduced thermal convection, $\lambda_{conv1}$, as air movement is seriously restricted within small porous network struc- tures. Second, the sub-micron and 25-26 nm nanopore sizes are closer to or smaller than the 70 nm mean free path of gas molecules in the air. Finally, the reflected radiation (A) of infrared light was significantly reduced due to the numerous solid-air interfaces in both sheath and aerogel core. These hierarchical porous structure serves multiple means to impede heat transfer and is evident when compared with the transparent CA cast sheet (the inset image in FIG. 3E). Common hollow fibers with nonporous sheath have been used alone or combined with solid fibers to achieve heat shielding and insulation by trapping air in the hollow core. The multiscale pores in the sheath of the hollow fiber reported here offer additional advantages of being lighter, more porous and better thermally insulating than the ordi- nary hollow fibers, while also function as the processing template for aerogel formation in the core.

The thermal conductivity of the aerogel core ($\lambda_{aerogel}$) can be expressed by $$\lambda_{aerogel}=\lambda_{cond2}+\lambda_{conv2}+\lambda_{rad2} \qquad (3)$$

where $\lambda_{cond2}$ is thermal conduction through the gas (air) and the solid (CNF) in the aerogel core. $\lambda_{conv2}$ and $\lambda_{rad2}$ are the heat transfer by convection and radiation of the aerogel, respectively.

The CNF aerogel core within hollow fiber further inhibits the thermal transfer mechanism in several ways. The large 10¹-10² μm cellular spacings in CNF aerogel inhibit con- vection by restraining air circulation in the over 99.5% pore volume, while permitting heat transfer by the poor thermal conducting and irregularly connected cellular walls whose highly crystallinity prohibit infrared radiation effectively in comparison to the optically transparent polymer films or silica aerogels. Clearly, the porous sheath of the hollow fiber surrounding the CNF aerogel core serves several crucial structural roles by providing the internal space and compat- ible surfaces for infilling aqueous CNF aerogel precursor; the multiscale pore structure of the sheath allows water vapor diffusivity for aerogel formation; and the protective outer layer for handling. The multiscale porous structure in the sheath as well as in the ultra-porous aerogel core contribute synergistically in restraining thermal transfer by convection, conduction, and radiation.

Thermal conductivities of solid cellulose nanopaper made by vacuum filtration of nanocelluloses are 0.3-0.5 W (mK)⁻ 1, irrespective of cellulose sources (including Tunicate, bacterial cellulose, cotton, and wood pulp) or nanocellulose preparation by sulfuric acid hydrolysis or TEMPO-mediated oxidation. In contrast, the thermal conductivities of wood- derived CNF aerogels measured by transient hot-wire or temperature wave method were 0.018-0.06 W (mK)⁻¹, one order of magnitude lower than nanopaper due to their high porosity (>99%). It is obvious that the thermal conductivity depends on the density and the microstructure of the aero- gels. Some of the aerogels have lower conductivity than air (0.025 W (mK)⁻¹), due mainly to their 30 nm pore sizes, smaller than the mean free path of the air (70 nm). As the pores in the aerogel core is tens of micrometer in widths (FIGS. 2G-2H), the thermal conductivity of the CNF aerogel here measured by a transient hot disk method was 0.04 W $(mK)^{-1}$, higher than air.

Like most polymers, cellulose acetate (CA) solid has a thermal conductivity of 0.20 W $(mK)^{-1}$. The porous sheath of the CA hollow fibers gave lower measured thermal conductivity of 0.10 W $(mK)^{-1}$, attributing to its multiscale pores ranging from larger micropores (several to tens of μm or averaged 14.5±13.1 μm) to the much smaller ca. 25 nm wide nanopores on both inner and outer surfaces that reduce overall heat transfer by convection and conduction, respectively. The aerogel core consists of large ($10^1$-$10^2$ μm) cellular spacings that significantly reduce convection. Couple the effective radiative heat barrier of both CA and CNF solids and the high sheath and core porosities, both the CNF aerogel core and CA-rich sheath contribute to the very low 0.07 W $(mK)^{-1}$ thermal conductivity of the coaxial fibers. While this measured thermal conductivity is higher than previously reported biobased aeropectin bulk aerogel and aeroSF fibers, the tensile strength of 4.7 MPa tensile strain of 6.1% of this coaxial aerogel fiber are far superior than silk aerogel AeroSF fiber with a reported 0.95 MPa tensile strength of and 0.08% breaking strain.

The superior thermal insulation property of coaxial fibers ($\lambda_{fiber}$) is attributed to the synergistic thermal insulation characteristics of both the porous sheath and the aerogel core. In theory, the thermal insulation of such coaxial fibers may be further improved by engineering the microstructure in both core and sheath. For instance, reducing the pore sizes in the sheath to below the 70 nm mean free path of air, closing the opened cellular network into enclosed air pockets, or reducing the pore size of the aerogel core could potentially improve the conductive insulation of the coaxial fibers, while maintaining similar porosity. However, the volume ratio of the aerogel core and sheath may also need to be tuned to balance density, porosity, as well as thermal insulation performance for specific need.

The effect of coaxial fiber layers on the insulation performance was conducted over a hotplate heated from 30 to 150° C., with typical images shown in FIGS. 4A-4C at $T_h$=50, 100, and 150° C., respectively. For the 5-layers coaxial fiber mat, the $T_f$ was as low as 34, 57, and 81° C., corresponding to |ΔT| of 16, 43, and 69° C. at $T_h$=50, 100, and 150° C., respectively. It is obvious that the greater numbers of layers, the lower the rate of heat transfer. By increasing the thickness of the coaxial fiber mat through which heat is transferred, as well as trapping pockets of air between the individual layers offer better thermal insulation. Thus, any targeted insulation performance of contact surfaces can be tuned by simply varying the thickness of the coaxial fiber mat or changing the numbers of the mat layers. Additional variation may include using different fiber diameters and sheath-core proportions to meet specific needs.

Figures 5A, 5B, 5C:
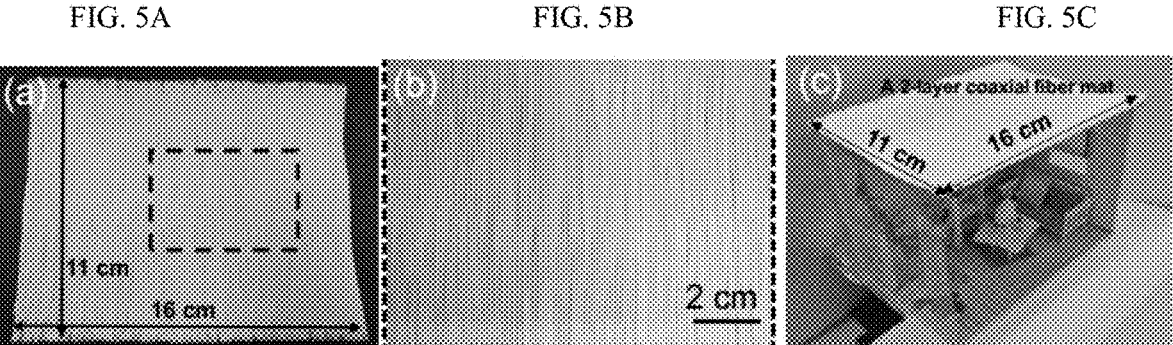
Figure 5D:
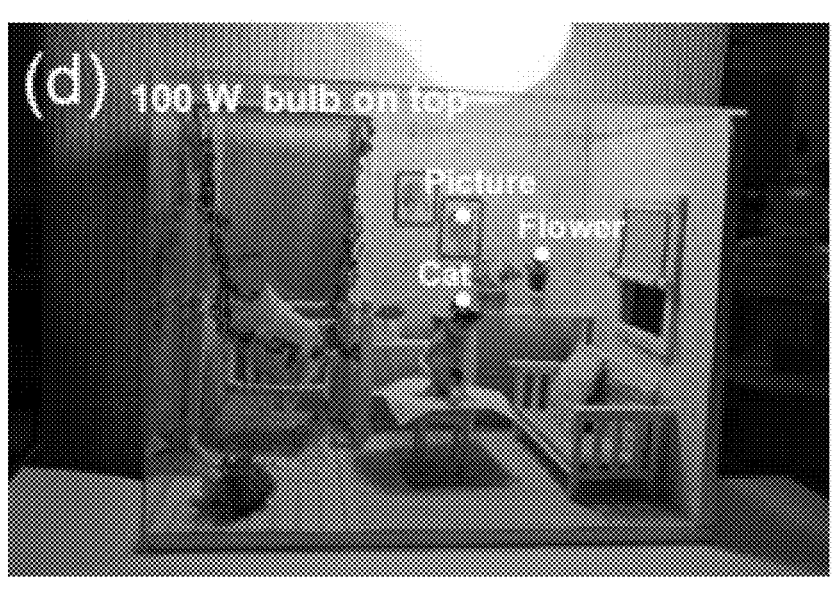
FIG. 5D shows a photograph of the toy house in hot environments. A bright 100 W bulb was placed 1 cm away from the top of the roof or the fiber mat to create the "hot weather" around the toy house. The marked white dots of "Picture", "Flower", and "Cat" are the representative temperature detection locations in the following experiments.
Figure 6:
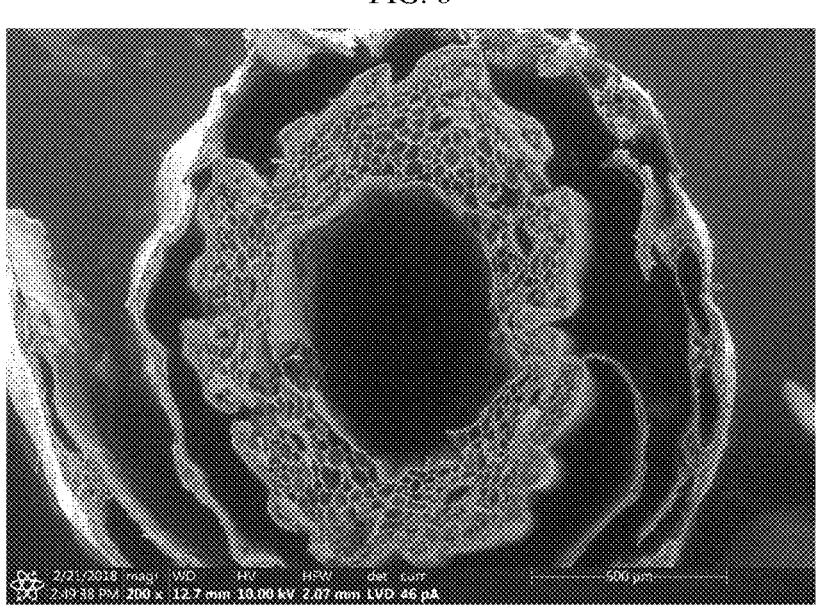
FIG. 6 shows SEM image of a typical rice straw cross-section showing multi-scale porous microstructures.
Figure 11:
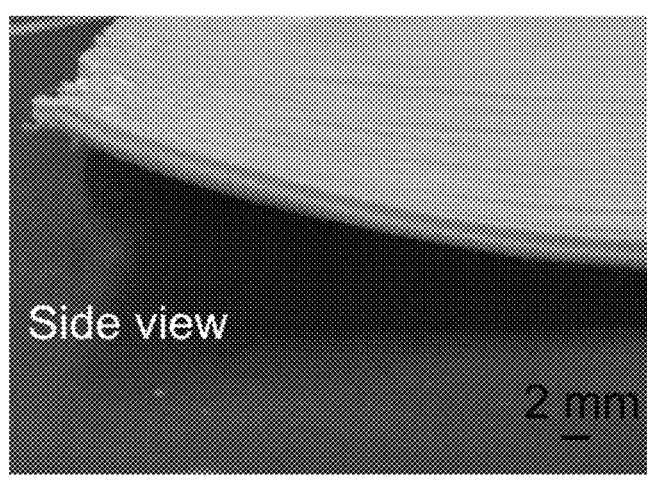
FIG. 11 shows the photographic side view of 2-layer coaxial fiber mat.

Further, the thermal insulation performance of coaxial fibers under hot and cold environment, a larger area 2-layer of coaxial fiber mat (dimension: 16 cm×11 cm×0.2 cm) was made by packing 150 of 16 cm-length fibers unidirectionally as the base layer, then overlay parallelly another layer of 150 fibers, as shown in FIGS. 5A-5B and FIG. 11. Then a toy house (dimension: 16 cm×11.5 cm×13 cm) was constructed and the fiber m 5c). The front wall of the house was left open to observe temperature distribution inside using a thermal camera. Summer heat was simulated by lighting a 100 W bulb 1 cm away from the top of the roof (FIGS. 5D-5F). After 20 min of irradiation from the bulb, the thermal image shows significantly lower temperature distribution in the house with coaxial fiber mat on the roof than that without (FIGS. 5E-5F). On the other hand, Winter cold was simulated by placing dry ice (in an aluminum tray) on the top of the roof (FIGS. 5G-5I). After 20 mins of cooling by the dry ice, the house with coaxial fiber mat on the roof remained warmer than that without coaxial fibers (FIGS. 5H-5I) The temperatures at various locations in the house represented by "Picture", "Flower", and "Cat" marked as white dots in FIGS. 5D and 5G were plotted over time in FIGS. 5G-5L. Upon heating, the internal temperatures in the house with coaxial fiber mats on the roof rose nearly linearly within the first 7 to 12 min, then levelled to 20 min, but were 6.2, 10.4 and 6.5° C. lower at "Picture", "Flower", and "Cat" locations, respectively (FIGS. 5J-5L). Upon cooling, temperatures in the house with coaxial fiber mats on the roof dropped at a higher rate within the first 5 to 10 min, then slowly lowered to 5.2, 4.8 and 4.0° C. higher at same "Picture", "Flower", and "Cat" locations, respectively (FIGS. 5M-5O). These simulations show the effectiveness of the coaxial fiber mat as thermal insulation for an enclosure or space to resists the heat gain in a hot environment and to heat loss in a cold environment. One can imagine that the temperature in the room can be tuned to a comfort zone by using different layers or diameter of coaxial fibers (FIG. 4A-4E). Moreover, this spatial thermal insulation application of the coaxial fibers is feasible in a wide range of environmental temperatures from −20 to 150° C., making it beneficial for civil engineering and related industrial applications.

Highly porous and strong coaxial cellulose-rich fibers have been successfully engineered to consist multiscale porous CA/PAA sheath and CNF aerogel core as novel thermal insulation materials. Wet spinning hollow fibers provide the porous sheath to not only facilitate the formation of CNF aerogel in the core but also protects and gives mechanical strength to the aerogel core. The coaxial fibers exhibit unique characteristics of high porosity (85%), low density (0.2 g/cm$^3$), and high specific tensile strength (23.5±2.5 MPa g cm$^{-3}$) to perform effectively as thermal insulators under a wide range of working temperatures from −20 to 150° C. Both the porous sheath and the CNF aerogel core of the coaxial fibers play crucial roles in achieving the excellent thermal insulation. Most significantly, the structural formation approach for the porous sheath and core coaxial fibers opens up entirely new possibilities in engineering continuous fibrous form of aerogel in varied diameters and is scalable. The development and proof of concept of these porous coaxial fibers represent a breakthrough in biobased thermal insulation materials, and this approach may revolutionize sustainable energy-saving solution for wearable devices and building structures.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A coaxial fiber comprising
an exterior and an interior, wherein
the coaxial fiber exterior is a cellulose fiber sheath comprising cellulose and polyacrylic acid; and the coaxial fiber interior is a core surrounded by the cellulose fiber sheath, wherein the core comprises an aerogel.

2. The coaxial fiber of claim 1, wherein the cellulose fiber sheath comprises a ratio of about 90:10 to 99:1 of cellulose to polyacrylic acid.

3. The coaxial fiber of claim 1, wherein the cellulose fiber sheath comprises a ratio of about 92:8 of cellulose to polyacrylic acid.

4. The coaxial fiber of claim 1, wherein the cellulose fiber sheath comprises pores.

5. The coaxial fiber of claim 4, wherein the pores have a size of about 20 nm to about 40 μm.

6. The coaxial fiber of claim 1, wherein the aerogel comprises a cellulose nanofibril (CNF) aerogel.

7. The coaxial fiber of claim 1, wherein the coaxial fiber has an outer diameter of about 500 μm to about 1500 μm.

8. The coaxial fiber of claim 1, wherein the coaxial fiber has a porosity of at least about 85%.

9. The coaxial fiber of claim 1, wherein the coaxial fiber has a density of about 0.2 $g/cm^3$.

10. The coaxial fiber of claim 1, wherein the coaxial fiber has a specific tensile strength of about 20 $MPa·g/cm^3$ to about 30 $MPa·g/cm^3$.

11. The coaxial fiber of claim 1, wherein:
the cellulose fiber sheath comprises pores having a size of about 20 nm to about 40 μm;
the aerogel comprises a cellulose nanofibril (CNF) aerogel; and
the coaxial fiber has an outer diameter of about 500 μm to about 1500 μm, porosity of about 85%, a density of about 0.2 $g/cm^3$, and a specific tensile strength of about 21 MPa $g/cm^3$ to about 26 MPa $g/cm^3$.

12. A method for preparing the coaxial fiber of claim 1, the method comprising:
(a) wet-spinning an organic solution comprising cellulose acetate and polyacrylic acid on the exterior of a water core to form a coaxial fiber comprising an exterior and an interior, wherein the coaxial fiber exterior is a cellulose fiber sheath and the coaxial fiber interior is a core filled with water;
(b) removing the water from the core of the coaxial fiber resulting from step (a) to form a hollow core;
(c) injecting an aqueous cellulose nanofibril suspension into the hollow core of the coaxial fiber resulting from step (b); and
(d) freeze-drying the coaxial fiber resulting from step (c) to form a coaxial fiber comprising an exterior and an interior, wherein the coaxial fiber exterior is a cellulose fiber sheath and the coaxial fiber interior is a core comprising a nanofibril aerogel, thereby forming the coaxial fiber of claim 1.

13. The method of claim 12, wherein the organic solution comprises dimethylacetamide.

14. The method of claim 12, wherein the organic solution comprises about 30:1 to about 20:5 w/w of cellulose acetate to polyacrylic acid.

15. The method of claim 12, wherein the organic solution comprises about 23:2 w/w of cellulose acetate to polyacrylic acid.

16. The method of claim 15, wherein the organic solution comprises about 16% by weight of 23:2 w/w of cellulose acetate to polyacrylic acid.

17. The method of claim 12, further comprising after step (a), the step of (a1) soaking the coaxial fiber resulting from step (a) in a water bath for about 15 hours.

18. The method of claim 12, wherein removing the water in step (b) comprises freeze-drying the coaxial fiber, thereby forming the hollow core.

19. The method of claim 12, wherein the aqueous cellulose nanofibril suspension comprises about 0.7% by weight of cellulose.

20. The method of claim 12, wherein the method comprises:
(a) wet-spinning an organic solution comprising dimethylacetamide, cellulose acetate, and polyacrylic acid, on the exterior of a water core to form a coaxial fiber comprising an exterior and an interior, wherein the coaxial fiber exterior is a cellulose fiber sheath and the coaxial fiber interior is a core filled with water, and wherein the organic solution comprises about 16% by weight of 23:2 w/w of cellulose acetate to polyacrylic acid;
(a1) soaking the coaxial fiber resulting from step (a) in a water bath for about 15 hours;
(b) removing the water from the core, wherein removing the water comprises freeze-drying the coaxial fiber resulting from step (a1);
(c) injecting an aqueous cellulose nanofibril suspension comprising about 0.7% by weight of cellulose into the hollow core of the coaxial fiber resulting from step (b); and
(d) freeze-drying the coaxial fiber resulting from step (c) to form a coaxial fiber comprising an exterior and an interior, wherein the coaxial fiber exterior is a cellulose fiber sheath and the interior is a core comprising a nanofibril aerogel, thereby forming the coaxial fiber of claim 1.

21. A method of maintaining a temperature differential between a first zone having a first temperature, and a second zone having a second temperature, comprising:
separating the first zone and the second zone using a plurality of coaxial fibers of claim 1; and
applying thermal energy to the first zone such that the first temperature increases while the second temperature of the second zone increases by a lesser amount.

22. The method of claim 21, wherein the second zone is a container, a wearable object, clothing, gloves, heat-protective gear, house, building, airplane, trailer, or aircraft.

23. The method of claim 21, wherein the method can be performed from a temperature range of about −20° C. to 150° C.

* * * * *